(12) United States Patent
Cowles et al.

(10) Patent No.: US 12,460,246 B2
(45) Date of Patent: Nov. 4, 2025

(54) DNA-BARCODED NUCLEOSOMES FOR CHROMATIN MAPPING ASSAYS

(71) Applicant: EPICYPHER, INC., Durham, NC (US)

(72) Inventors: Martis W. Cowles, Chapel Hill, NC (US); Zu-Wen Sun, Brentwood, TN (US); Michael-Christopher Keogh, Cambridge, MA (US); Bryan Jacob Venters, Cary, NC (US); Ellen Nichole Weinzapfel, Durham, NC (US)

(73) Assignee: EPICYPHER, INC., Durham, NC (US)

( * ) Notice: Subject to any disclaimer, the term of this patent is extended or adjusted under 35 U.S.C. 154(b) by 1083 days.

(21) Appl. No.: 17/416,928

(22) PCT Filed: Dec. 20, 2019

(86) PCT No.: PCT/US2019/067735
§ 371 (c)(1),
(2) Date: Jun. 21, 2021

(87) PCT Pub. No.: WO2020/132388
PCT Pub. Date: Jun. 25, 2020

(65) Prior Publication Data
US 2022/0042074 A1    Feb. 10, 2022

Related U.S. Application Data

(60) Provisional application No. 62/783,861, filed on Dec. 21, 2018.

(51) Int. Cl.
*C12Q 1/6806*    (2018.01)
*G01N 33/68*    (2006.01)

(52) U.S. Cl.
CPC ....... *C12Q 1/6806* (2013.01); *G01N 33/6875* (2013.01)

(58) Field of Classification Search
CPC ............ C12Q 1/6806; C12Q 2563/131; C12Q 2563/179; C12Q 2565/133; C12Q 2565/514; G01N 33/6875; G01N 2500/10
See application file for complete search history.

(56) References Cited

U.S. PATENT DOCUMENTS

| | | | |
|---|---|---|---|
| 2015/0197801 A1 | 7/2015 | Muir et al. | |
| 2018/0217161 A1 | 8/2018 | Khoja et al. | |

FOREIGN PATENT DOCUMENTS

| | | | |
|---|---|---|---|
| JP | 2015521462 A | 7/2015 | |
| JP | 2017506073 A | 3/2017 | |
| WO | 2013184930 A2 | 12/2013 | |
| WO | 2014205296 A1 | 12/2014 | |
| WO | 2015117145 A1 | 8/2015 | |
| WO | 2017147279 A1 | 8/2017 | |

OTHER PUBLICATIONS

Zhou et al (2015, Date Published: Aug. 20, 2015, Molecular Cell, cited on attached Form PTO-892; herein referred to as Zhou) (Year: 2015).*
Cutter et al. (2015. Date Available Online: May 14, 2015, FEBS Letters, cited on attached Form PTO-892; herein referred to as Cutter). (Year: 2015).*
Baller et al. (2012, Date Published: 2012, Research, http://www.genome.org/cgi/doi/10.1101/gr.129585.111) {herein Baller}. (Year: 2012).*
Heinkoff et al. (2010, Date Published: Apr. 2010, Reviews, www.nature.com/reviews/molcellbio) {herein Heinkoff}. (Year: 2010).*
Jiang et al (2009, Published Mar. 2009, Reviews, www.nature.com/reviews/genetics) {herein Jiang}. (Year: 2009).*
Nguyen et al (2014, Date Available: Aug. 2014, HHS Public Access, doi: 10.1038/nmeth.3022) {herein Nguyen}. ( Year: 2014).*
Sato et al (2019, Date Accepted: Jul. 22, 2019, Open Biology, royalsocietypublishing.org/journal/rsob) {herein Sato}. (Year: 2019).*
Huang et al (2013, Date Published: Oct. 7, 2013, Biosci. Biotechnol. Biochem, http://dx.doi.org/10.1271/bbb.130399) {herein Huang}. (Year: 2013).*
K Singh, Raushan, et al. "Protein engineering approaches in the post-genomic era." Current Protein and Peptide Science 19.1 ( 2018): 5-15. (Year: 2018).*
Zhang, Meiling, David A. Case, and Jeffrey W. Peng. "Propagated perturbations from a peripheral mutation show interactions supporting WW domain thermostability." Structure 26.11 (2018): 1474-1485. (Year: 2018).*
Biotin (2025, Gene Link) {herein Biotin}. (Year: 2025).*
Liszczak et al (First Published: Aug. 28, 2018, DNA Nanotechnology) {herein Liszczak} (Year: 2018).*
Lai et al (Date Published: Sep. 2017, Nat Rev Mol Cell Biol.) (Year: 2017).*
Shaytan et al (Date Available Online: Feb. 27, 2015, Current Opinion in Structural Biology) (Year: 2015).*
Clark et al (Date Published: Jun. 2010, NIH Public Access) {herein Clark) (Year: 2010).*
Nguyen et al (2014, Date Available: Aug. 2014, HHS Public Access, doi: 10.1038/nmeth.3022, cited on PTO-892 mailed Sep. 17, 2024) {herein Nguyen} (Year: 2014).*
Skene, Peter J, et al., "An efficient targeted nuclease strategy for high-resolution mapping of DNA binding sites", eLife, 6:e21856, Jan. 16, 2017.

(Continued)

*Primary Examiner* — Manjunath N Rao
*Assistant Examiner* — Erica Nicole Jones-Foster
(74) *Attorney, Agent, or Firm* — Myers Bigel, P.A.

(57) ABSTRACT

The present invention relates to DNA-barcoded recombinant nucleosomes and polynucleosomes that have been engineered for use as spike-in controls for chromatin accessibility assays, chromatin mapping assays, e.g., using tethered enzymes, as well as other chromatin assays. The invention further relates to methods of using the engineered DNA-barcoded recombinant nucleosomes in chromatin accessibility assays, chromatin mapping assays, as well as other chromatin assays.

21 Claims, 2 Drawing Sheets

(56) References Cited

OTHER PUBLICATIONS

"International Preliminary Report on Patentability corresponding to International Application No. PCT/2019/067735 mailed mailed Jul. 1, 2021".

"International Search Report and Written Opinion corresponding to International Application No. PCT/2019/067735 mailed Apr. 24, 2020".

Bednar, Jan, et al., "Structure and Dynamics of a 197 bp Nucleosome in Complex with Linker Histone H1", Molecular Cell 66(3):384-397 (May 4, 2017).

Voong, Lilien N, et al., "Genome-wide Mapping of the Nucleosome Landscape by Micrococcal Nuclease and Chemical Mapping", Trends in Genetics 33(8):496-507 (Aug. 2017).

"Extended European Search Report corresponding to European Application No. 19898873.5 dated Sep. 8, 2022".

Grzybowski, Adrian T, et al., "Calibrating ChIP-Seq with Nucleosomal Internal Standards to Measure Histone Modification Density Genome Wide", Molecular Cell 58(5):886-899 (Jun. 4, 2015).

Koshisakabe, Mitsunaga, "Mechiruka DNA wo .fukumu Nukureosomu no Kozoseibutsugakutekibunseki", Kakyuuhi Detabesu 2017, 1-5.

Skene, Peter J, et al., "Targeted in situ genome-wide profiling with high efficiency for low cell numbers", Nat Protoc. 13(5):1006-1019 (Apr. 12, 2018).

Linheiro, et al., "Testing the palindromic target site model for DNA transposon insertion using the *Drosophila melanogaster* P-element", Nucleic Acids Research 36(19):6199-6208 (Nov. 1, 2008).

* cited by examiner

DNA-BARCODED NUCLEOSOMES FOR CHROMATIN MAPPING ASSAYS

STATEMENT OF PRIORITY

This application is a 35 U.S.C. § 371 national phase application of PCT Application PCT/US2019/067735, filed on Dec. 20, 2019, which claims the benefit of U.S. Provisional Application Ser. No. 62/783,861, filed on Dec. 21, 2018, the entire contents of each of which are incorporated by reference herein.

FIELD OF THE INVENTION

The present invention relates to DNA-barcoded recombinant nucleosomes and polynucleosomes that have been engineered for use as spike-in controls for chromatin accessibility assays, chromatin mapping assays, e.g., using tethered enzymes, as well as other chromatin assays. The invention further relates to methods of using the engineered DNA-barcoded recombinant nucleosomes in chromatin accessibility assays, chromatin mapping assays, as well as other chromatin assays.

BACKGROUND OF THE INVENTION

Chromatin structure drives the regulation of gene transcription by controlling the accessibility of regulatory machinery (e.g. transcription factors) to engage DNA (Stavreva and Hager 2015). This process is controlled in part by the local positioning of nucleosomes on the DNA template (Bai and Morozov 2010). So-called 'open' regions are largely devoid of nucleosomes and often associated with poised or actively transcribed genes (Tsompana and Buck 2014). In contrast, genomic regions with high nucleosome density are often transcriptionally inactive, since this conformation restricts access by the regulatory machinery. As a result, chromatin accessibility is a hallmark of active gene status that tightly tracks cellular differentiation and identity (Natarajan, Yardimci et al. 2012, Jung, Angarica et al. 2017, Cao, Cusanovich et al. 2018, Miyamoto, Nguyen et al. 2018). Consequently, the genomic distribution of highly accessible chromatin regions is altered in many human pathologies from cancer (Gomez, Hepperla et al. 2016, Qu, Zaba et al. 2017, Corces, Granja et al. 2018) and aging (Ucar, Marquez et al. 2017, Janes, Dong et al. 2018, Wang, Zibetti et al. 2018) to neuropsychiatric disease (Medrano-Fernandez and Barco 2016, Fullard, Hauberg et al. 2018, Rizzardi, Hickey et al. 2019).

Changes in chromatin structure are mediated in part by histone post-translational modifications (PTMs), which include methylation, acetylation, and phosphorylation. Over 100 unique histone PTMs (or combinations thereof) have been linked to human disease, from neurodegeneration (Coppede 2014) to multiple cancers (Witt, Deubzer et al. 2009, Kobayashi, Jakt et al. 2013, Greenblatt and Nimer 2014, Chopra and Bohlander 2015, Gajer, Furdas et al. 2015, Hanmod, Wang et al. 2015). As such, chromatin modifiers are compelling drug targets (Cai, Chen et al. 2015), and histone PTMs are an emerging class of cancer biomarkers that may be useful for early disease detection and informing personalized treatment strategies (Chervona and Costa 2012, Khan, Reddy et al. 2015).

The development of highly versatile/reliable assays to analyze chromatin accessibility and histone PTM landscapes are greatly needed as they are broadly applicable to a range of research interests, including chromatin research, drug development, and personalized medicine. In addition to cell-based assays, these approaches may also be useful to examine cell-free nucleosomes, which are released from dying cells and can be found in most bodily fluids, such as blood. Indeed, genomic analysis of cell-free nucleosomes (using chromatin accessibility or histone PTM mapping) may provide non-invasive biomarkers for early disease detection, including cancer (Leon, Shapiro et al. 1977, Holdenrieder, Stieber et al. 2001, Snyder, Kircher et al. 2016, Ulz, Thallinger et al. 2016).

There are several commercially available approaches for the genome-wide analysis of chromatin accessibility. Early assays used DNase I followed by sequencing (DNase-seq) to identify nucleosome-depleted regions (i.e. DNase I hypersensitivity sites; DHSs) genome-wide (Crawford, Holt et al. 2006, Boyle, Davis et al. 2008). A related approach using micrococcal nuclease (MNase) has also been developed (Schlesinger, Smith et al. 2013). While these approaches work with both native (i.e. unfixed) and fixed cells, they require high cell numbers and extensive sample optimization. Recent improvements to the DNase I protocol enable DNAase hypersensitivity site mapping using a single cell (scDNase), but the resulting data individually covers <2% of the reference genome, significantly limiting its utility (Jin, Tang et al. 2015). FAIRE-seq (formaldehyde assisted isolation of regulator element sequencing) is a highly sensitive approach to enrich nucleosome-depleted regions, but requires large cell numbers and (as the name suggests) formaldehyde fixation (Giresi, Kim et al. 2007). ATAC-seq uses a Tn5 transposase that preferentially targets and delivers its sequence adaptor payload into accessible regions (Buenrostro, Wu et al. 2015). This method has quickly garnered field adoption due to its speed and low cell requirements. Indeed, ATAC-seq assays can be performed in a single day and have recently been developed for single cell applications, which would be of great utility for clinical assays (Buenrostro, Giresi et al. 2013). However, ATAC-seq is incompatible with fixed tissues and often needs careful optimization. Moreover, the approach requires high sequencing depth (100-150 million reads per sample since >50% of reads come from mitochondrial DNA and are discarded) and single cell data is very sparse (similar to scDNase samples above). Thus, despite impressive advances in the field, there is a lack of common methodology for chromatin accessibility mapping.

Histone PTMs are commonly mapped using Chromatin ImmunoPrecipitation (ChIP) (Collas 2010, Nakato and Shirahige 2017). In this approach, specific antibodies (or analogous enrichment reagents) are used to enrich nucleosomes that contain their target PTMs. The DNA associated with these nucleosomes is then isolated and quantified using qPCR or next-generation sequencing (NGS), respectively providing a local or genome-wide view of the PTM under study. Despite being one of the most widely used techniques in chromatin biology, ChIP methodology has experienced relatively few advancements since described more than three decades ago (Solomon and Varshavsky 1985). Rather, dramatic improvements in ChIP readout technologies, most recently including next-generation sequencing, has expanded the use and application of ChIP to genome-wide studies. However, ChIP is hampered by poor yields and low accuracy/reliability. Such limitations stem from the use of poorly validated "ChIP-grade" antibodies (Bock, Dhayalan et al. 2011, Egelhofer, Minoda et al. 2011, Fuchs, Krajewski et al. 2011, Fuchs and Strahl 2011, Nishikori, Hattori et al. 2012, Rothbart, Lin et al. 2012, Hattori, Taft et al. 2013, Rothbart, Dickson et al. 2015, Shah, Grzybowski et al.

2018), the inevitable backgrounds when enriching specific factors from a vast excess of fragmented competitor chromatin, and the lack of internal controls capable of monitoring specific PTM enrichment and normalizing signals at target loci (Chen, Hu et al. 2015). Of note, exogenous xeno-chromatin (typically from yeast or *Drosophila*) has been employed as a spike-in control for sample normalization (Orlando, Chen et al. 2014, Egan, Yuan et al. 2016); however, natural chromatin as a reagent is poorly defined, making it unable to provide data regarding antibody specificity/performance. Thus, next-generation histone PTM mapping tools are greatly needed.

New 'chromatin tethering' methods affix enzymes to specific genomic regions, resulting in labeling/release, and selective analysis of target material (e.g. DamID, ChIC, CUT&RUN, and CUT&Tag) (Klein and Hainer 2019). CUT&RUN and ChIC use a factor-specific antibody to tether a fusion protein of protein A and micrococcal nuclease (pA-MNase) to genomic binding sites in intact cells, which is then activated by the addition of calcium to cleave DNA. pA-MNase provides a cleavage tethering system for antibodies to any PTM, transcription factor, or chromatin protein of interest. The CUT&RUN protocol is further streamlined by using a solid support to adhere cells (or nuclei) to lectin-coated magnetic beads, generating reliable genomic mapping data using as few as 100 cells (Skene, Henikoff et al. 2018, Meers, Bryson et al. 2019) and 3 million reads. These advances simplify processing, dramatically increase sample recovery, and enable protocol automation.

Similar to CUT&RUN, CUT&Tag uses antibodies to bind chromatin proteins in situ, and then tethers a protein A, protein G/hyperactive Tn5 transposase (pAG-Tn5) fusion to these sites. Upon controlled activation, the Tn5 selectively fragments and integrates adapter sequences at the genomic sites. The tagged target DNA is then amplified and sequenced, thereby bypassing several library preparation steps, saving time (total workflow time of <1 day) and eliminating a source of experimental bias. Importantly, CUT&Tag assays generate highly reliable data similar to CUT&RUN. Further, the high sensitivity (i.e., signal-to-noise; FRiP analysis) of the CUT&Tag approach make it amenable to ultra-low inputs, including single cell (Kaya-Okur, Wu et al. 2019). Despite the remarkable advances in chromatin mapping assays (e.g., chromatin accessibility assays, ChIP-seq, and immunotethering assays), sample variability and the inability to monitor antibody performance (for antibody-based applications) remain formidable technical barriers.

Spike-in controls are needed for all genome-wide analyses as they i) are essential for normalizing samples to enable cross-sample comparisons and ii) can be used as internal controls to monitor assay variation (e.g., antibody specificity/efficiency or technical variability). DNA-barcoded recombinant nucleosomes carrying histone PTMs were recently developed as spike-in controls to standardize ChIP methodology (named Internally calibrated ChIP or ICeChIP; WO 2015/117145). A version of the ICeChIP approach has been commercialized as SNAP-ChIP®. ICeChIP technology utilizes pools of DNA-barcoded designer nucleosomes (dNucs) carrying specific histone PTMs as internal control standards to monitor antibody performance (i.e., specificity/efficiency and technical variability in situ) and for quantitative sample normalization. In this approach, DNA-barcoded nucleosomes panels, comprising one or more nucleosomes carrying unique PTMs at a single or range of concentrations(s), are spiked into samples before or after chromatin fragmentation. The resulting nucleosome mix (dNuc and cell derived) is immunoprecipitated with a bead-immobilized antibody specific for the PTM of interest. After subsequent processing, qPCR (or NGS) data from the IP and INPUT pools is analyzed for the number of reads detected for: 1) each DNA barcode; and, 2) sample DNA. Read numbers for each immunoprecipitation are then normalized to the INPUT concentration for each barcoded dNuc, providing a direct quantitation of sample DNA reads. dNucs serve as direct performance reagents/calibrators as they mimic the endogenous antibody target (modified mononucleosomes), and are subject to the same sources of variability experienced by the sample chromatin during ChIP processing.

In addition to ChIP methodology, DNA-barcoded recombinant nucleosomes have also been applied to develop medium-throughput chromatin binding ([19]; WO 2013/184930) and remodeling [20] assays. In each application, DNA-barcoded nucleosomes are comprised of synthetic DNA template(s) wrapped to a uniquely (un)modified histone octamer. Current "ChIP-compatible" DNA-barcoded recombinant nucleosomes are incompatible with a chromatin accessibility assays (e.g., MNase-seq or ATAC-seq) and immunotethering approaches (e.g., CUT&RUN or CUT&Tag). Specifically, they do not contain the necessary means for immobilization or sufficient linker DNA sequence for enzyme targeting (e.g., MNase or Tn5).

Given the above, there is a need in the art for improved controls for chromatin mapping assays.

SUMMARY OF INVENTION

The present invention relates to DNA-barcoded recombinant nucleosomes and polynucleosomes that have been engineered for use as spike-in controls for chromatin accessibility assays, chromatin mapping assays (e.g., using tethered enzymes), as well as other chromatin assays. The invention further relates to methods of using the engineered DNA-barcoded recombinant nucleosomes in chromatin accessibility and mapping assays. Of note, nucleosome spike-in controls may be used in assays that contain multiple cells (i.e., bulk analysis), single cells (i.e., single cell analysis), or cell-free nucleosomes. These spike-in controls may be used for several major applications, including without limitation assay optimization, technical variability monitoring, quantitative sample normalization, and antibody performance testing (for antibody-based assays, e.g., antibody target specificity and capture efficiency).

Current DNA-barcoded nucleosome spike-ins are assembled using 147 bp DNA (e.g., SNAP-ChIP from EpiCypher; catalog No. 19-1001), which is sufficient to wrap the histone octamer but not extend beyond to create free "linker DNA". The DNA barcode is protected from modifying enzymes (such as MNase or Tn5) as it is located within the 147 bp nucleosome positioning sequence. This is ideal for ChIP assays as they can be used in native ChIP workflows that i) require nucleosomes to be soluble and ii) use MNase to digest chromatin into mononucleosomes prior to IP. Current nucleosome spike-ins also lack a binding moiety for assays that use a solid support.

The present invention describes novel DNA-barcoded nucleosomes comprising a modified nucleosome positioning sequence that contains linker DNA to allow for the targeting of enzymes that are commonly used in chromatin accessibility assays (e.g., Tn5 tagmentation for ATAC-seq) or chromatin immunotethering assays (e.g., pAG-MNase cleavage for CUT&RUN or pAG-Tn5 tagmentation for CUT&Tag). The nucleosome spike-ins may be further modified to contain a binding moiety (e.g., a DNA biotin-tag) for immobilization. These modified DNA-barcoded dNucs will serve as direct calibrators because they mimic the endogenous target (i.e., chromatin) and are subject to the same sources of variability experienced by the sample chromatin during processing.

Thus, one aspect of the invention relates to a nucleosome comprising:
 a. a protein octamer, containing two copies each of histones H2A, H2B, H3, and H4, and optionally, linker histone H1; and
 b. a DNA molecule, comprising:
  i. a nucleosome positioning sequence,
  ii. a DNA barcode indicative of the identity and/or concentration of a nucleosome feature; and
  iii. a nuclease or transposase recognition sequence;
 wherein the nucleosome feature is none, one, or more of the histones comprising a post-translational modification or a mutation and/or a histone variant and/or the DNA molecule comprising a post-transcriptional modification.

In some embodiments, the nucleosome further comprises:
 c. a binding member linked to the DNA molecule, wherein the binding member specifically binds to a binding partner.

The invention further relates to a panel of the nucleosomes of the invention, wherein the panel comprises at least two nucleosomes comprising different nucleosome features.

Another aspect of the invention relates to a polynucleosome comprising:
 a. two or more protein octamers, each containing two copies each of histones H2A, H2B, H3, and H4, and optionally, linker histone H1; and
 b. a DNA molecule, comprising:
  i. a nucleosome positioning sequence,
  ii. a DNA barcode indicative of the identity and/or concentration of a nucleosome feature; and
  iii. a nuclease or transposase recognition sequence;
 wherein the nucleosome feature is none, one, or more of the histones comprising a post-translational modification or a mutation and/or a histone variant and/or the DNA molecule comprising a post-transcriptional modification.

In some embodiments, the polynucleosome further comprises:
 c. a binding member linked to the DNA molecule, wherein the binding member specifically binds to a binding partner.

An additional aspect of the invention relates to an array comprising the polynucleosomes of the invention.

A further aspect of the invention relates to a pool of the array of the invention, wherein each array comprises a nucleosome feature.

Another aspect of the invention relates to a bead comprising a binding partner to the binding member of the nucleosome, panel, polynucleosome, array, or pool of the invention, wherein the bead is bound to the nucleosome, panel, polynucleosome, array, or pool.

An additional aspect of the invention relates to a kit comprising the nucleosome, panel, polynucleosome, array, pool, or bead of the invention.

A further aspect of the invention relates to a method for chromatin mapping or determining chromatin accessibility, wherein the improvement is the use of the nucleosome, panel, polynucleosome, array, pool, or bead of the invention in the assay as a spike-in control.

The methods may be carried out with or without using a solid support.

Another aspect of the invention relates to a method for mapping chromatin using tethered enzymes, comprising the steps of:
 a) permeabilizing a cell, nucleus, organelle, or tissue;
 b) adding the nucleosome, panel, polynucleosome, array, or pool of the invention to the permeabilized cell, nucleus, organelle, or tissue of a);
 c) contacting the permeabilized cell, nucleus, organelle, or tissue of b) and the nucleosome, panel, polynucleosome, array, or pool of b) with an antibody, aptamer, or recognition agent that specifically binds to a nucleosome feature;
 d) adding an antibody-binding agent or recognition agent-binding agent linked to a nuclease or transposase;
 e) allowing the nuclease or transposase to cleave and/or tag DNA in the cell, nucleus, organelle, or tissue and the nuclease or transposase recognition sequence in the nucleosome, panel, polynucleosome, array, or pool;
 f) optionally separating cleaved and/or tagged DNA; and
 g) identifying the cleaved and/or tagged DNA;
 thereby mapping chromatin;
 wherein the nucleosome feature is none, one, or more of the histones comprising a post-translational modification or a mutation and/or a histone variant and/or the DNA molecule comprising a post-transcriptional modification.

Another aspect of the invention relates to a method for mapping chromatin using tethered enzymes, comprising the steps of:
 a) binding a cell, nucleus, organelle, tissue, or cell-free nucleosome to a solid support;
 b) permeabilizing the cell, nucleus, organelle, or tissue;
 c) binding the nucleosome, panel, polynucleosome, array, or pool of the invention to a solid support;
 d) contacting the permeabilized cell, nucleus, organelle, or tissue of b) or the cell-free nucleosome of a) and the bound nucleosome, panel, polynucleosome, array, or pool of c) with an antibody, aptamer, or recognition agent that specifically binds to a nucleosome feature;
 e) adding an antibody-binding agent or recognition agent-binding agent linked to a nuclease or transposase;
 f) allowing the nuclease or transposase to cleave and/or tag DNA in the cell, nucleus, organelle, tissue, or cell-free nucleosome and the nuclease or transposase recognition sequence in the nucleosome, panel, polynucleosome, array, or pool;
 g) optionally separating cleaved and/or tagged DNA; and
 h) identifying the cleaved and/or tagged DNA;
 thereby mapping chromatin;
 wherein the nucleosome feature is none, one, or more of the histones comprising a post-translational modification or a mutation and/or a histone variant and/or the DNA molecule comprising a post-transcriptional modification.

An additional aspect of the invention relates to a method for determining chromatin accessibility, comprising the steps of:
 a) permeabilizing the cell, nucleus, organelle, or tissue;
 b) adding the nucleosome, panel, polynucleosome, array, or pool of the invention to the permeabilized cell, nucleus, organelle, or tissue of a);
 c) contacting the permeabilized cell, nucleus, organelle, or tissue of a) and the nucleosome, panel, polynucleosome, array, or pool of b) with a transposase;

d) allowing the transposase to tag DNA in the cell, nucleus, organelle, or tissue and in the nucleosome, panel, polynucleosome, array, or pool; and
e) identifying the tagged DNA;
thereby determining chromatin accessibility.

An additional aspect of the invention relates to a method for determining chromatin accessibility, comprising the steps of:
a) binding a cell, nucleus, organelle, tissue, or cell-free nucleosome to a solid support;
b) permeabilizing the cell, nucleus, organelle, or tissue;
c) binding the nucleosome, panel, polynucleosome, array, or pool of the invention to a solid support;
d) contacting the permeabilized cell, nucleus, organelle, or tissue of b) or the cell-free nucleosome of a) and the bound nucleosome, panel, polynucleosome, array, or pool of c) with a transposase;
e) allowing the transposase to tag DNA in the cell, nucleus, organelle, tissue, or cell-free nucleosome and in the nucleosome, panel, polynucleosome, array, or pool; and
f) identifying the tagged DNA;
thereby determining chromatin accessibility.

A further aspect of the invention relates to a method for detecting and quantitating the presence of an epigenetic modification or mutation in chromatin, comprising using the methods of the invention.

Another aspect of the invention relates to a method for determining and quantitating the epigenetic or mutation status of chromatin in a subject having a disease or disorder, comprising using the methods of the invention.

An additional aspect of the invention relates to a method for monitoring changes in epigenetic or mutation status of chromatin over time in a subject, comprising using the methods of the invention.

A further aspect of the invention relates to a method for measuring on-target activity of an epigenetic-targeting drug, comprising using the methods of the invention.

Another aspect of the invention relates to a method for monitoring the effectiveness of an epigenetic therapy or mutation therapy in a subject having a disease or disorder associated with epigenetic modifications or mutations, comprising using the methods of the invention.

An additional aspect of the invention relates to a method for selecting a suitable treatment for a subject having a disease or disorder associated with epigenetic modifications or mutations based on the epigenetic or mutation status of chromatin in the subject, comprising using the methods of the invention.

A further aspect of the invention relates to a method for determining a prognosis for a subject having a disease or disorder associated with epigenetic modifications or mutations based on the epigenetic or mutation status of chromatin in the subject, comprising using the methods of the invention.

Another aspect of the invention relates to a method for identifying a biomarker of a disease or disorder associated with epigenetic modifications or mutations based on the epigenetic or mutation status of chromatin in a subject, comprising using the methods of the invention.

An additional aspect of the invention relates to a method for screening for an agent that modifies the epigenetic or mutation status of chromatin in a subject, comprising using the methods of the invention.

A further aspect of the invention relates to a method for assaying chromatin for a histone post-translational modification, mutation, and/or histone variant and/or a DNA post-transcriptional modification, wherein the improvement is the use of the nucleosome, panel, polynucleosome, array, pool, or bead of the invention in the assay as a spike-in control.

Another aspect of the invention relates to a method for assaying binding of a factor to chromatin, wherein the improvement is the use of the nucleosome, panel, polynucleosome, array, pool, or bead of the invention in the assay as a spike-in control.

These and other aspects of the invention are set forth in more detail in the description of the invention below.

BRIEF DESCRIPTION OF THE DRAWINGS

FIGS. 2A-2E show (FIGS. 2A-2B) DNA template design for DNA-barcoded nucleosome spike-ins.

DETAILED DESCRIPTION OF THE INVENTION

The present invention is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following specification is intended to illustrate some particular embodiments of the invention, and not to exhaustively specify all permutations, combinations and variations thereof.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Nucleotide sequences are presented herein by single strand only, in the 5' to 3' direction, from left to right, unless specifically indicated otherwise. Nucleotides and amino acids are represented herein in the manner recommended by the IUPAC-IUB Biochemical Nomenclature Commission, or (for amino acids) by either the one-letter code, or the three letter code, both in accordance with 37 C.F.R. § 1.822 and established usage.

Except as otherwise indicated, standard methods known to those skilled in the art may be used for production of recombinant and synthetic polypeptides, antibodies or antigen-binding fragments thereof, manipulation of nucleic acid sequences, production of transformed cells, the construction of nucleosomes, and transiently and stably transfected cells. Such techniques are known to those skilled in the art. See, e.g., SAMBROOK et al., MOLECULAR CLONING: A LABORATORY MANUAL 4th Ed. (Cold Spring Harbor, NY, 2012); F. M. AUSUBEL et al. CURRENT PROTOCOLS IN MOLECULAR BIOLOGY (Green Publishing Associates, Inc. and John Wiley & Sons, Inc., New York).

All publications, patent applications, patents, nucleotide sequences, amino acid sequences and other references mentioned herein are incorporated by reference in their entirety.

As used in the description of the invention and the appended claims, the singular forms "a," "an" and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

Moreover, the present invention also contemplates that in some embodiments of the invention, any feature or combination of features set forth herein can be excluded or omitted.

Furthermore, the term "about," as used herein when referring to a measurable value such as an amount of a compound or agent of this invention, dose, time, temperature, and the like, is meant to encompass variations of ±10%, ±5%, ±1%, ±0.5%, or even ±0.1% of the specified amount.

The term "consisting essentially of" as used herein in connection with a nucleic acid, protein means that the nucleic acid or protein does not contain any element other than the recited element(s) that significantly alters (e.g., more than about 1%, 5% or 10%) the function of interest of the nucleic acid or protein.

As used herein, the term "polypeptide" encompasses both peptides and proteins, unless indicated otherwise.

A "nucleic acid" or "nucleotide sequence" is a sequence of nucleotide bases, and may be RNA, DNA or DNA-RNA hybrid sequences (including both naturally occurring and non-naturally occurring nucleotide), but is preferably either single or double stranded DNA sequences.

As used herein, an "isolated" nucleic acid or nucleotide sequence (e.g., an "isolated DNA" or an "isolated RNA") means a nucleic acid or nucleotide sequence separated or substantially free from at least some of the other components of the naturally occurring organism or virus, for example, the cell or viral structural components or other polypeptides or nucleic acids commonly found associated with the nucleic acid or nucleotide sequence.

Likewise, an "isolated" polypeptide means a polypeptide that is separated or substantially free from at least some of the other components of the naturally occurring organism or virus, for example, the cell or viral structural components or other polypeptides or nucleic acids commonly found associated with the polypeptide.

By "substantially retain" a property, it is meant that at least about 75%, 85%, 90%, 95%, 97%, 98%, 99% or 100% of the property (e.g., activity or other measurable characteristic) is retained.

A first aspect of the invention relates to a nucleosome comprising:
 a. a protein octamer, containing two copies each of histones H2A, H2B, H3, and H4, and optionally, linker histone H1; and
 b. a DNA molecule, comprising:
  i. a nucleosome positioning sequence,
  ii. a DNA barcode indicative of the identity and/or concentration of a nucleosome feature; and
  iii. a nuclease or transposase recognition sequence;
 wherein the nucleosome feature is none, one, or more of the histones comprising a post-translational modification or a mutation and/or a histone variant and/or the DNA molecule comprising a post-transcriptional modification.

In some embodiments, the nucleosome further comprises:
 c. a binding member linked to the DNA molecule, wherein the binding member specifically binds to a binding partner.

In some embodiments, the DNA molecule comprises a linker between the nucleosome positioning sequence and the binding member that is about 10 to about 80 nucleotides in length, wherein the linker comprises the nuclease or transposase recognition sequence. In some embodiments, the linker is about 15 to about 40 nucleotides in length, e.g., about 15 to about 30 nucleotides in length, e.g., about 10, 15, 20, 25, 30, 35, 40, 45, 50, 55, 60, 65, 70, 75, or 80 nucleotides in length or any range therein.

The nuclease or transposase recognition sequence may be any nucleotide sequence that is preferably recognized by a nuclease or transposase. In some embodiments, the nuclease or transposase recognition sequence is recognized by an endodeoxyribonuclease. Suitable endodeoxyribonucleases include, without limitation, micrococcal nuclease, S1 nuclease, mung bean nuclease, pancreatic DNase I, yeast HO or I-SceI endonuclease, a restriction endonuclease, or a homing endonuclease, and modified or enhanced versions thereof. In some embodiments, the recognition sequence is an A/T-rich region.

In some embodiments, the nuclease or transposase recognition sequence is recognized by a transposase. Suitable transposases include, without limitation, Tn5, Mu, IS5, IS91, Tn552, Ty1, Tn7, Tn/O, Mariner, P Element, Tn3, Tn10, or Tn903, and modified or enhanced versions thereof. In certain embodiments, the transposase is an enhanced Tn5. In some embodiments, the recognition sequence is a G/C-rich region.

In some embodiments, the linker comprises both a nuclease recognition sequence (e.g., one or more patches of A/T rich sequences) and a transposase recognition sequence (e.g., one or more patches of G/C rich sequences) so that the nucleosomes of the invention can be used for multiple methods. An A/T rich region or G/C rich region is one that contains more than 50%, A/T bases or G/C bases, respectively, e.g., more than 50%, 55%, 60%, 65%, 70%, 75%, or 80%.

When a binding member is present, it may be one half of a binding pair that provides a specific binding interaction. In some embodiments, a suitable binding member and its binding partner include, without limitation, biotin with avidin or streptavidin, a nano-tag with streptavidin, glutathione with glutathione transferase, an antigen/epitope with an antibody, polyhistidine with nickel, a polynucleotide with a complementary polynucleotide, an aptamer with its specific target molecule, or Si-tag and silica.

The binding member may be linked to the DNA molecule at any position where the binding member is exposed for access by the binding partner. In some embodiments, the binding member is linked to the 5' end of the DNA molecule. In some embodiments, the binding member is linked to the 3' end of the DNA molecule.

The DNA barcode may be any length and sequence that is suitable to uniquely identify the nucleosome and the feature associated with the nucleosome. DNA barcodes may be used to denote any type of unique feature of the DNA-barcoded nucleosome, including modification type (e.g. DNA methylation, histone methylation, histone variants, etc.), replicate number (e.g., technical replicates), or concentration. The DNA barcode may also denote the absence of any modifications. In some embodiments, the DNA barcode has a length of about 6 to about 50 basepairs, e.g., about 7 to about 30 basepairs, e.g., about 8 to about 20 basepairs, e.g., about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 basepairs or any range therein.

Each of the histones in the nucleosome is independently fully synthetic, semi-synthetic, or recombinant. Methods of producing histones synthetically, semi-synthetically, or recombinantly are well known in the art.

The histone PTM may be any PTM for which measurement is desirable. In some embodiments, the histone PTM is, without limitation, N-acetylation of serine and alanine; phosphorylation of serine, threonine and tyrosine; N-crotonylation, N-acylation of lysine; N6-methylation, N6,N6-dimethylation, N6,N6,N6-trimethylation of lysine; omega-N-methylation, symmetrical-dimethylation, asymmetrical-dimethylation of arginine; citrullination of arginine; ubiquitinylation of lysine; sumoylation of lysine; O-methylation of serine and threonine, ADP-ribosylation of arginine, aspartic acid and glutamic acid, or any combination thereof.

The histone mutation may be any mutation known in the art or any mutation of interest. In some embodiments, the histone mutations are oncogenic mutations, e.g., mutations associated with one or more types of cancer. Known oncogenic histone mutations include, without limitation, H3K4M, H3K9M, H3K27M, H3G34R, H3G34V, H3G34W, H3K36M, or any combination thereof.

Several naturally occurring histone variants are known in the art and any one or more of them may be included in the nucleosome. Histone variants include, without limitation, H3.3, H2A.Bbd, H2A.Z.1, H2A.Z.2, H2A.X, mH2A1.1, mH2A1.2, mH2A2, TH2B, or any combination thereof.

The DNA post-transcriptional modification may be any modification for which measurement is desirable. In some embodiments, the DNA post-transcriptional modification is 5-methylcytosine, 5-hydroxymethylcytosine, 5-formylcytosine, 5-carboxylcytosine, 3-methylcytosine, or any combination thereof.

The invention further relates to a panel of the nucleosomes of the invention, wherein the panel comprises at least two nucleosomes comprising different nucleosome features.

Each nucleosome in the panel may be represented by a unique DNA barcode. In some embodiments, the panel comprises, 2, 3, 4, 5, 6, 7, 8, 9, 10, 12, 15, 18, 21, 25, 30, 35, or 40 or more nucleosomes comprising different nucleosome features or any range therein. In some embodiments, each nucleosome comprising a different nucleosome feature is present at the same concentration in the panel. In other embodiments, each nucleosome comprising a different nucleosome feature is present at multiple concentrations in the panel and the DNA barcode of each nucleosome indicates the concentration at which the nucleosome is present in the panel. In some embodiments, the panel further comprises a nucleosome which does not comprise a nucleosome feature, e.g., has no PTM or other modification, e.g., for use as a control. In some embodiments, the panel may comprise nucleosomes having a desirable set of nucleosome features, e.g., all known methylation PTMs or all known acetylation PTMs.

Another aspect of the invention relates to a polynucleosome comprising:
  a. two or more protein octamers, each containing two copies each of histones H2A, H2B, H3, and H4, and optionally, linker histone H1; and
  b. a DNA molecule, comprising:
    i. a nucleosome positioning sequence,
    ii. a DNA barcode indicative of the identity and/or concentration of a nucleosome feature; and
    iii. a nuclease or transposase recognition sequence;
  wherein the nucleosome feature is none, one, or more of the histones comprising a post-translational modification or a mutation and/or a histone variant and/or the DNA molecule comprising a post-transcriptional modification.

In some embodiments, the polynucleosome further comprises:
  c. a binding member linked to the DNA molecule, wherein the binding member specifically binds to a binding partner.

In some embodiments, the polynucleosome comprises 2-10 nucleosomes, e.g., 2, 3, 4, 5, 6, 7, 8, 9, or 10 nucleosomes or any range therein.

The polynucleosome may comprise any of the embodiments of linker, nuclease or transposase recognition sequence, binding member and binding partner, DNA barcode, and nucleosome feature as described above for nucleosomes.

Each histone in the polynucleosome is independently fully synthetic, semi-synthetic, or recombinant.

An additional aspect of the invention relates to an array comprising the polynucleosomes of the invention. The nucleosome array can contain a single nucleosome feature (e.g. histone PTM, DNA modification, histone mutation, etc.) or be comprised of an ensemble of different features. DNA barcodes on the array can be used to denote the entire array or unique features within the array.

A further aspect of the invention relates to a pool of the array of the invention, wherein each array comprises a nucleosome feature. In some embodiments, the nucleosome array panel comprises, 2, 3, 4, 5, 6, 7, 8, 9, 10, 12, 15, 18, 21, 25, 30, 35, or 40 or more nucleosome arrays comprising different nucleosome features or any range therein. In some embodiments, each nucleosome array comprising a different nucleosome feature is present at the same concentration in the panel. In other embodiments, each nucleosome array comprising a different nucleosome feature is present at multiple concentrations in the panel and the DNA barcode of each nucleosome indicates the concentration at which the nucleosome is present in the panel. In some embodiments, the panel further comprises a nucleosome array, which does not comprise a nucleosome feature, e.g., has no PTM or other modification, e.g., for use as a control.

Another aspect of the invention relates to a solid support, e.g., a bead, comprising a binding partner to the binding member of the nucleosome, panel, polynucleosome, array, or pool of the invention, wherein the bead is bound to the nucleosome, panel, polynucleosome, array, or pool. The bead may be any bead suitable for separating a cell, nucleus, organelle, or tissue from a sample and/or to attach the cell, nucleus, organelle, or tissue to a solid support. The bead may be composed of natural materials (e.g., alginate) or synthetic materials (e.g., polystyrene). In some embodiments, the bead is a magnetic bead that can be separated by exposure to a magnetic field.

An additional aspect of the invention relates to a kit comprising the nucleosome, panel, polynucleosome, array, pool, or bead of the invention. In some embodiments, the kit may further comprise an antibody, aptamer, or other recognition agent that specifically binds to a nucleosome feature. In some embodiments, the kit may further comprise a nuclease or transposase linked to an antibody-binding protein or to an entity that binds the recognition agent. In certain embodiments, the antibody-binding protein may be, without limitation, protein A, protein G, a fusion between protein A and protein G, protein L, or protein Y. In some embodiments, the entity that binds the recognition agent is a protein. In other embodiments, the kit may further comprise a nuclease or transposase that is not linked to an antibody-binding protein or to an entity that binds the recognition agent. In certain embodiments, the kit may further comprise a bead comprising a binding partner to the binding member, e.g., a magnetic bead. The kit may further comprise reagents and/or containers for carrying out the methods of the invention, e.g., buffers, enzymes (e.g., nucleases, transposases), detection agents, etc. In some embodiments, the kit may further comprise instructions for carrying out the methods of the invention.

The nucleosomes and polynucleosomes of the invention may be used as spike-in controls in any chromatin assay known in the art in which an improved control/calibrator would be useful. Examples include, without limitation, the CUT&RUN assay (WO 2019/060907), the CUT&Tag assay (WO/2019/060907), the ChIC assay (U.S. Pat. No. 7,790,379), the ATAC-Seq assay (WO 2014/189957) and the ICeChIP assay (WO 2015/117145). Each of these references are incorporated herein in their entirety.

In some embodiments, the DNA-barcoded nucleosome, panel, polynucleosome, array, or pool may be used as a spike-in to chromatin accessibility assays at a single concentration or a range of concentrations, wherein each concentration is represented by one or more nucleosome. In some embodiments, the DNA-barcoded nucleosome, panel, polynucleosome, array, or pool may be used for assay optimization and/or quantitative cross-sample comparisons. In some embodiments, these assays include ATAC-seq and may be performed in bulk (i.e., multiple cells) or on a single cell. In some embodiments, these assays can be performed in whole cells or extracted nuclei that are permeabilized. In some embodiments, assays are performed on a solid support. In some embodiments, quantitative recovery of spike-in reads can be used to normalize two or more samples. Further, this quantitative comparison of two or more biological samples genome-wide or at a specific loci can be used to test the utility of a therapy, diagnose a disease, determine disease prognosis, or monitor patient response to drug treatment.

In some embodiments, the DNA-barcoded nucleosome, panel, polynucleosome, array, or pool may be used as a spike-in to immunotethering assays at a single concentration or a range of concentrations, wherein each concentration is represented by one or more nucleosome. In some embodiments, the DNA-barcoded nucleosome, panel, polynucleosome, array, or pool may be used for antibody specificity testing, assay optimization, and/or quantitative cross-sample comparisons. In some embodiments, these assays include CUT&RUN and CUT&Tag assays and can be performed in bulk (i.e., multiple cells) or on a single cell. In some embodiments, spike-ins contain a binding moiety to bind to a solid support. In some embodiments, spike-ins do not contain a binding moiety capable of binding a solid support. In some embodiments, quantitative recovery of spike-in reads can be used to normalize two or more samples. Further, this quantitative comparison of two or more biological samples genome-wide or at a specific loci can be used to test the utility of a therapy, diagnose a disease, determine disease prognosis, or monitor patient response to drug treatment.

Thus, a further aspect of the invention relates to a method for chromatin mapping or determining chromatin accessibility, wherein the improvement is the use of the nucleosome, panel, polynucleosome, array, pool, or bead of the invention in the assay as a spike-in control.

Another aspect of the invention relates to a method for mapping chromatin using tethered enzymes, comprising the steps of:

a) permeabilizing a cell, nucleus, organelle, or tissue;
b) adding the nucleosome, panel, polynucleosome, array, or pool of the invention to the permeabilized cell, nucleus, organelle, or tissue of a);
c) contacting the permeabilized cell, nucleus, organelle, or tissue of b) and the nucleosome, panel, polynucleosome, array, or pool of b) with an antibody, aptamer, or recognition agent that specifically binds to a nucleosome feature;
d) adding an antibody-binding agent or recognition agent-binding agent linked to a nuclease or transposase;
e) allowing the nuclease or transposase to cleave and/or tag DNA in the cell, nucleus, organelle, or tissue and the nuclease or transposase recognition sequence in the nucleosome, panel, polynucleosome, array, or pool;
f) optionally separating cleaved and/or tagged DNA; and
g) identifying the cleaved and/or tagged DNA;
thereby mapping chromatin;
wherein the nucleosome feature is none, one, or more of the histones comprising a post-translational modification or a mutation and/or a histone variant and/or the DNA molecule comprising a post-transcriptional modification.

In some embodiments, the nuclease or transposase of step (d) is inactive and step (e) comprises activating the nuclease or transposase, e.g., by adding an ion such as calcium or magnesium.

Another aspect of the invention relates to a method for mapping chromatin using tethered enzymes, comprising the steps of:

a) binding a cell, nucleus, organelle, tissue, or cell-free nucleosome to a solid support; b) permeabilizing the cell, nucleus, organelle, or tissue;
c) binding the nucleosome, panel, polynucleosome, array, or pool of the invention to a solid support;
d) contacting the permeabilized cell, nucleus, organelle, or tissue of b) or the cell-free nucleosome of a) and the bound nucleosome, panel, polynucleosome, array, or pool of c) with an antibody, aptamer, or recognition agent that specifically binds to a nucleosome feature; e) adding an antibody-binding agent or recognition agent-binding agent linked to a nuclease or transposase;
f) allowing the nuclease or transposase to cleave and/or tag DNA in the cell, nucleus, organelle, tissue, or cell-free nucleosome and the nuclease or transposase recognition sequence in the nucleosome, panel, polynucleosome, array, or pool;

g) separating cleaved and/or tagged DNA; and h) identifying the cleaved and/or tagged DNA;

thereby mapping chromatin;

wherein the nucleosome feature is none, one, or more of the histones comprising a post-translational modification or a mutation and/or a histone variant and/or the DNA molecule comprising a post-transcriptional modification.

In some embodiments, the nuclease or transposase of step (e) is inactive and step (f) comprises activating the nuclease or transposase, e.g., by adding an ion such as calcium or magnesium.

In some embodiments, identifying the cleaved and/or tagged DNA comprises subjecting the cleaved and/or tagged DNA to amplification and/or sequencing, e.g., by qPCR, Next Generation Sequencing, or Nanostring. In some embodiments, the method further comprises determining the identity of the nucleosome, panel, polynucleosome, array, or pool based on the sequence of the DNA barcode in the cleaved and/or tagged DNA.

In some embodiments, the method further comprises optimizing the method based on the results detected with the nucleosome, panel, polynucleosome, array, or pool. For example, the recovery of on-target/off-target DNA-barcoded nucleosomes could be used to optimize enzyme concentration, enzyme activation time, cell-to-enzyme ratio, etc.

The methods may be carried out using any suitable format that provides a solid support for the cell, nucleus, organelle, or tissue. In some embodiments, the solid support is a bead, e.g., a magnetic bead. In some embodiments, the solid support is a well of a plate, e.g., 6, 12, 24, 96, 384, or 1536-well plates.

An additional aspect of the invention relates to a method for determining chromatin accessibility, comprising the steps of:

a) permeabilizing the cell, nucleus, organelle, or tissue;

b) adding the nucleosome, panel, polynucleosome, array, or pool of the invention to the permeabilized cell, nucleus, organelle, or tissue of a);

c) contacting the permeabilized cell, nucleus, organelle, or tissue of a) and the nucleosome, panel, polynucleosome, array, or pool of b) with a transposase;

d) allowing the transposase to tag DNA in the cell, nucleus, organelle, or tissue and in the nucleosome, panel, polynucleosome, array, or pool; and e) identifying the tagged DNA;

thereby determining chromatin accessibility.

In some embodiments, the transposase of step (c) is inactive and step (d) comprises activating the nuclease or transposase, e.g., by adding an ion such as calcium or magnesium.

An additional aspect of the invention relates to a method for determining chromatin accessibility, comprising the steps of:

a) binding a cell, nucleus, organelle, tissue, or cell-free nucleosome to a solid support; b) permeabilizing the cell, nucleus, organelle, or tissue;

c) binding the nucleosome, panel, polynucleosome, array, or pool of the invention to a solid support;

d) contacting the permeabilized cell, nucleus, organelle, or tissue of b) or the cell-free nucleosome of a) and the bound nucleosome, panel, polynucleosome, array, or pool of c) with a transposase;

e) allowing the transposase to tag DNA in the cell, nucleus, organelle, tissue, or cell-free nucleosome and in the nucleosome, panel, polynucleosome, array, or pool; and f) identifying the tagged DNA;

thereby determining chromatin accessibility.

In some embodiments, the transposase of step (d) is inactive and step (e) comprises activating the nuclease or transposase, e.g., by adding an ion such as calcium or magnesium.

In some embodiments, identifying the tagged DNA comprises subjecting the tagged DNA to amplification and/or sequencing, e.g., by qPCR, Next Generation Sequencing, or Nanostring. In some embodiments, the method further comprises determining the identity of the nucleosome, panel, polynucleosome, array, or pool based on the sequence of the DNA barcode in the tagged DNA.

In some embodiments, the method further comprises optimizing the method based on the results detected with the nucleosome, panel, polynucleosome, array, or pool. For example, the recovery of on-target/off-target DNA-barcoded nucleosome array panels could be used to optimize enzyme concentration, enzyme activation time, cell-to-enzyme ratio, etc.

In some embodiments, the cell, nucleus, organelle, or tissue is obtained from a biological sample. The biological sample used in the methods of the invention may be any suitable sample.

In some embodiments, the sample is comprised of cell-free nucleosomes obtained from bodily fluids, such as blood, serum, plasma, urine, saliva, semen, prostatic fluid, nipple aspirate fluid, lachrymal fluid, perspiration, feces, cheek swabs, cerebrospinal fluid, cell lysate samples, amniotic fluid, gastrointestinal fluid, biopsy tissue, lymphatic fluid, or cerebrospinal fluid. Assays on cell-free nucleosomes may be performed by capturing sample nucleosomes onto a solid support. In some embodiments, the cell-free nucleosomes may be captured using a general nucleosome binding agent (e.g., an agent that binds to an unmodified region of the nucleosome, such as the C-terminus of histone H3 or the 'acid patch' found at the interface of histone H2A and histone H2B). In some embodiments, the cell-free nucleosomes may be captured using a binding agent that specifically binds a histone post-translational modification, histone mutation, histone variant, or DNA post-transcriptional modification, e.g., in order to amp combinatorial modifications. The captured cell-free nucleosomes can then be analyzed for chromatin accessibility or chromatin mapping using the methods described herein.

The methods may be carried out using any suitable format with or without a solid support for the cell, nucleus, organelle, or tissue. In some embodiments, the solid support is a bead, e.g., a magnetic bead. In some embodiments, the solid support is a well of a plate, e.g., 6, 12, 24, 96, 384, or 1536-well plates.

The antibody, aptamer, or recognition agent use in the methods of the invention may be any agent that specifically recognizes and binds to a target, e.g., an antigen. The term "antibody" includes antigen-binding fragments thereof, such as scFv, Fab, Fv, Fab', F(ab')$_2$ fragments, dAb, VHH, nanobodies, V(NAR) or minimal recognition units.

A further aspect of the invention relates to a method for detecting and quantitating the presence of an epigenetic modification or mutation in chromatin, comprising using the methods of the invention. An antibody, aptamer, or recognition agent that specifically binds to the epigenetic modification or mutation may be used to detect and quantitate the modification or mutation.

Another aspect of the invention relates to a method for determining and quantitating the epigenetic or mutation status of chromatin in a subject having a disease or disorder, comprising using the methods of the invention. An antibody, aptamer, or recognition agent that specifically binds to one or more epigenetic modifications or mutations that may be associated with the disease or disorder of the subject may be used to detect and quantitate the modifications or mutations. By this method, one can determine if a subject having a disease or disorder, e.g., a tumor, has an epigenetic modification or mutation that is known to be associated with the tumor type.

An additional aspect of the invention relates to a method for monitoring changes in epigenetic or mutation status of chromatin over time in a subject, comprising using the methods of the invention. This method may be used to determine if the epigenetic or mutation status is improving, stable, or worsening over time. The steps of the method may be repeated as many times as desired to monitor changes in the status of an epigenetic modification or mutation, e.g., 2, 3, 4, 5, 6, 7, 8, 9, 10, 25, 50, or 100 or more times. The method may be repeated on a regular schedule (e.g., daily, weekly, monthly, yearly) or on an as needed basis. The method may be repeated, for example, before, during, and/or after therapeutic treatment of a subject; after diagnosis of a disease or disorder in a subject; as part of determining a diagnosis of a disease or disorder in a subject; after identification of a subject as being at risk for development of a disease or disorder; or any other situation where it is desirable to monitor possible changes in epigenetic modifications or mutations.

A further aspect of the invention relates to a method for measuring on-target activity of an epigenetic-targeting drug, comprising using the methods of the invention. The methods may be carried out before, during, and/or after administration of an epigenetic-targeting drug to determine the capability of the drug to alter the epigenetic status of the subject.

Another aspect of the invention relates to a method for monitoring the effectiveness of an epigenetic therapy or mutation therapy in a subject having a disease or disorder associated with epigenetic modifications or mutations, comprising using the methods of the invention.

Epigenetic therapies are those designed to alter the epigenetic status of proteins (e.g., histones) or DNA. One example of an epigenetic therapy includes lysine deacetylase inhibitors (formerly termed histone deacetylase inhibitors) (e.g., vorinostat (suberoylanilide hydroxamic acid), CI-994 (tacedinaline), MS-275 (entinostat), BMP-210, M344, NVP-LAQ824, LBH-529 (panobinostat), MGCD0103 (mocetinostat), PXD101 (belinostat), CBHA, PCI-24781, ITF2357, valproic acid, trichostatin A, and sodium butyrate), which are used to treat cutaneous T-cell lymphoma (CTCL) or in clinical trials for the treatment of hematologic and solid tumors, including lung, breast, pancreas, renal, and bladder cancers, melanoma, glioblastoma, leukemias, lymphomas, and multiple myeloma. A further example of an epigenetic therapy is histone acetyltransferase inhibitors (e.g., epigallocatechin-3-gallate, garcinol, anacardic acid, CPTH2, curcumin, MB-3, MG149, C646, and romidepsin).

Another example of an epigenetic therapy is DNA methyltransferase inhibitors (e.g., azacytidine, decitabine, zebularine, caffeic acid, chlorogenic acid, epigallocatechin, hydralazine, procainamide, procaine, and RG108), which have been approved for treatment of acute myeloid leukemia, myelodysplastic syndrome, and chronic myelomonocytic leukemia and in clinical trials for treatment of solid tumors. Other epigenetic therapies include, without limitation, lysine methyltransferases (e.g., pinometostat, tazometostat, CPI-1205); lysine demethylases (e.g., ORY1001); arginine methyltransferases (e.g., EPZ020411); arginine deiminases (e.g., GSK484); and isocitrate dehydrogenases (e.g., enasidenib, ivosidenib). See Fischle et al., *ACS Chem. Biol.* 11:689 (2016); DeWoskin et al., *Nature Rev.* 12:661 (2013); Campbell et al., *J. Clin. Invest.* 124:64 (2014); and Brown et al., *Future Med. Chem.* 7:1901 (2015); each incorporated by reference herein in its entirety.

Mutation therapies include treatments designed to alter the nucleotide sequence of a gene (e.g., encoding a histone). Examples include, without limitation, gene therapy.

The steps of the method may be repeated as many times as desired to monitor effectiveness of the treatment, e.g., 2, 3, 4, 5, 6, 7, 8, 9, 10, 25, 50, or 100 or more times. The method may be repeated on a regular schedule (e.g., daily, weekly, monthly, yearly) or on as needed basis, e.g., until the therapeutic treatment is ended. The method may be repeated, for example, before, during, and/or after therapeutic treatment of a subject, e.g., after each administration of the treatment. In some embodiments, the treatment is continued until the method of the invention shows that the treatment has been effective.

An additional aspect of the invention relates to a method for selecting a suitable treatment for a subject having a disease or disorder associated with epigenetic modifications or mutations based on the epigenetic or mutation status of chromatin in the subject, comprising using the methods of the invention.

The method may be applied, for example, to subjects that have been diagnosed or are suspected of having a disease or disorder associated with epigenetic modifications or mutations. A determination of the epigenetic status or mutation status of an epitope may indicate that the status of an epitope has been modified and an epigenetic therapy or mutation therapy should be administered to the subject to correct the modification. Conversely, a determination that the status of an epitope has not been modified would indicate that an epigenetic therapy or mutation therapy would not be expected to be effective and should be avoided. For example, a determination that a particular genomic locus has been deacetylated may indicate that treatment with a histone deacetylase inhibitor would be appropriate. Similarly, a determination that a particular genomic locus has been hypermethylated may indicate that treatment with a DNA methyltransferase inhibitor would be appropriate.

A further aspect of the invention relates to a method for determining a prognosis for a subject having a disease or disorder associated with epigenetic modifications or mutations based on the epigenetic or mutation status of chromatin in the subject, comprising using the methods of the invention.

In some instances, the epigenetic status or mutational status of an epitope is indicative of the prognosis of a disease or disorder associated with epigenetic modifications or mutations. Thus, a determination of the epigenetic status or mutational status of an epitope in a subject that has been diagnosed with or is suspected of having a disease or disorder associated with epigenetic modifications or mutations may be useful to determine the prognosis for the subject. Many such examples are known in the art. One example is prostate cancer and hypermethylation of the glutathione-S transferase P1 (GSTP1) gene promoter, the adenomatous polyposis coli (APC) gene, the genes PITX2, C1orf114 and GABRE-miR-452~miR-224, as well as the three-gene marker panel AOX1/C1orf114/HAPLN3 and the 13-gene marker panel GSTP1, GRASP, TMP4, KCNC2, TBX1, ZDHHC1, CAPG, RARRES2, SAC3D1, NKX2-1, FAM107A, SLC13A3, FILIP1L. Another example is prostate cancer and histone PTMs, including, without limitation, increased H3K18Acetylation and H3K4diMethylation associated with a significantly higher risk of prostate tumor recurrence, H4K12Acetylation and H4R3diMethylation correlated with tumor stage, and H3K9diMethylation associated with low-grade prostate cancer patients at risk for tumor recurrence. Another example is the link between overall survival in breast cancer patients and methylation status of CpGs in the genes CREB5, EXPH5, ZNF775, ADCY3, and ADMA8. Another example is glioblastoma and hypermethylation of intronic regions of genes like EGFR, PTEN, NF1, PIK3R1, RB1, PDGFRA, and QKI. A further example is inferior prognosis for colon cancer and methylation status of the promoter of the CNRIP1, FBN1, INA, MAL, SNCA, and SPG20 genes.

Another aspect of the invention relates to a method for identifying a biomarker of a disease or disorder associated with epigenetic modifications or mutations based on the epigenetic or mutation status of chromatin in a subject, comprising using the methods of the invention.

In this method, biological samples of diseased tissue may be taken from a number of patients have a disease or disorder and the epigenetic or mutation status of one or more epitopes determined. Correlations between the epitope status and the occurrence, stage, subtype, prognosis, etc., may then be identified using analytical techniques that are well known in the art.

In any of the methods of the invention, the disease or disorder associated with epigenetic modifications or mutations may be a cancer, a central nervous system (CNS) disorder, an autoimmune disorder, an inflammatory disorder, or an infectious disease.

The cancer may be any benign or malignant abnormal growth of cells, including but not limited to acoustic neuroma, acute granulocytic leukemia, acute lymphocytic leukemia, acute myelogenous leukemia, adenocarcinoma, adrenal carcinoma, adrenal cortex carcinoma, anal cancer, anaplastic astrocytoma, angiosarcoma, basal cell carcinoma, bile duct carcinoma, bladder cancer, brain cancer, breast cancer, bronchogenic carcinoma, cervical carcinoma, cervical hyperplasia, chordoma, choriocarcinoma, chronic granulocytic leukemia, chronic lymphocytic leukemia, chronic myelogenous leukemia, colon cancer, colorectal cancer, craniopharyngioma, cystadenosarcoma, embryonic carcinoma, endometrium cancer, endotheliosarcoma, ependymoma, epithelial carcinoma, esophageal carcinoma, essential thrombocytosis, Ewing's tumor, fibrosarcoma, genitourinary carcinoma, glioblastoma, glioma, gliosarcoma, hairy cell leukemia, head and neck cancer, hemangioblastoma, hepatic carcinoma, Hodgkin's disease, Kaposi's sarcoma, leiomyosarcoma, leukemia, liposarcoma, lung cancer, lymphangioendotheliosarcoma, lymphangiosarcoma, lymphoma, malignant carcinoid carcinoma, malignant hypercalcemia, malignant melanoma, malignant pancreatic insulinoma, mastocytoma, medullar carcinoma, medulloblastoma, melanoma, meningioma, mesothelioma, multiple myeloma, mycosis fungoides, myeloma, myxoma, myxosarcoma, neuroblastoma, non-Hodgkin's lymphoma, non-small cell lung carcinoma, oligodendroglioma, osteogenic sarcoma, ovarian cancer, pancreatic cancer, papillary adenosarcoma, papillary sarcoma, pinealoma, polycythemia vera, primary brain carcinoma, primary macroglobulinemia, prostate cancer, rectal cancer, renal cell carcinoma, retinoblastoma, rhabdomyosarcoma, sebaceous gland sarcoma, seminoma, skin cancer, small cell lung carcinoma, soft-tissue sarcoma, squamous cell carcinoma, stomach carcinoma, sweat gland carcinoma, synovioma, testicular carcinoma, throat cancer, thyroid carcinoma, and Wilms' tumor.

CNS disorders include genetic disorders, neurodegenerative disorders, psychiatric disorders, and tumors. Illustrative diseases of the CNS include, but are not limited to, Alzheimer's disease, Parkinson's disease, Huntington's disease, Canavan disease, Leigh's disease, Refsum disease, Tourette syndrome, primary lateral sclerosis, amyotrophic lateral sclerosis, progressive muscular atrophy, Pick's disease, muscular dystrophy, multiple sclerosis, myasthenia gravis, Binswanger's disease, trauma due to spinal cord or head injury, Tay Sachs disease, Lesch-Nyan disease, epilepsy, cerebral infarcts, psychiatric disorders including mood disorders (e.g., depression, bipolar affective disorder, persistent affective disorder, secondary mood disorder, mania, manic psychosis), schizophrenia, schizoaffective disorder, schizophreniform disorder, drug dependency (e.g., alcoholism and other substance dependencies), neuroses (e.g., anxiety, obsessional disorder, somatoform disorder, dissociative disorder, grief, post-partum depression), psychosis (e.g., hallucinations and delusions, psychosis not otherwise specified (Psychosis NOS), dementia, aging, paranoia, attention deficit disorder, psychosexual disorders, sleeping disorders, pain disorders, eating or weight disorders (e.g., obesity, cachexia, anorexia nervosa, and bulemia), ophthalmic disorders involving the retina, posterior tract, and optic nerve (e.g., retinitis pigmentosa, diabetic retinopathy and other retinal degenerative diseases, uveitis, age-related macular degeneration, glaucoma), and cancers and tumors (e.g., pituitary tumors) of the CNS.

Autoimmune and inflammatory diseases and disorders include, without limitation, myocarditis, postmyocardial infarction syndrome, postpericardiotomy syndrome, Subacute bacterial endocarditis, anti-glomerular basement membrane nephritis, interstitial cystitis, lupus nephritis, autoimmune hepatitis, primary biliary cirrhosis, primary sclerosing cholangitis, antisynthetase syndrome, sinusitis, periodontitis, atherosclerosis, dermatitis, allergy, allergic rhinitis, allergic airway inflammation, chronic obstructive pulmonary disease, eosinophilic pneumonia, eosinophilic esophagitis, hypereosinophilic syndrome, graft-versus-host disease, atopic dermatitis, tuberculosis, asthma, chronic peptic ulcer, alopecia areata, autoimmune angioedema, autoimmune progesterone dermatitis, autoimmune urticaria, bullous pemphigoid, cicatricial pemphigoid, dermatitis herpetiformis, discoid lupus erythematosus, epidermolysis bullosa acquisita, erythema nodosum, gestational pemphigoid, hidradenitis suppurativa, lichen planus, lichen sclerosus, linear IgA disease, morphea, pemphigus vulgaris, *pityriasis* lichenoides et varioliformis *acuta*, Mucha-Habermann disease, psoriasis, systemic scleroderma, vitiligo, Addison's disease, autoimmune polyendocrine syndrome type 1, autoimmune polyendocrine syndrome type 2, autoimmune polyendocrine syndrome type 3, autoimmune pancreatitis, diabetes mellitus type 1, autoimmune thyroiditis, Ord's thyroiditis, Graves' disease, autoimmune oophoritis, endometriosis, autoimmune orchitis, Sjogren's syndrome, autoimmune enteropathy, celiac disease, Crohn's disease, irritable bowel syndrome, diverticulitis, microscopic colitis, ulcerative colitis, antiphospholipid syndrome, aplastic anemia, autoimmune hemolytic anemia, autoimmune lymphoproliferative syndrome, autoimmune neutropenia, autoimmune thrombocytopenic purpura, cold agglutinin disease, essential mixed cryoglobulinemia, Evans syndrome, pernicious anemia, pure red cell aplasia, thrombocytopenia, adiposis dolorosa, adult-onset Still's disease, ankylosing spondylitis, CREST syndrome, drug-induced lupus, enthesitis-related arthritis, eosinophilic fasciitis, Felty syndrome, IgG4-related disease, juvenile arthritis, Lyme disease (chronic), mixed connective tissue disease, palindromic rheumatism, Parry Romberg syndrome, Parsonage-Turner syndrome, psoriatic arthritis, reactive arthritis, relapsing polychondritis, retroperitoneal fibrosis, rheumatic fever, rheumatoid arthritis, sarcoidosis, Schnitzler syndrome, systemic lupus erythematosus, undifferentiated connective tissue disease, dermatomyositis, fibromyalgia, myositis, myasthenia gravis, neuromyotonia, paraneoplastic cerebellar degeneration, polymyositis, acute disseminated encephalomyelitis, acute motor axonal neuropathy, anti-N-methyl-D-aspartate receptor encephalitis, Balo concentric sclerosis, Bickerstaff's encephalitis, chronic inflammatory demyelinating polyneuropathy, Guillain-Barré syndrome, Hashimoto's encephalopathy, idiopathic inflammatory demyelinating diseases, Lambert-Eaton myasthenic syndrome, multiple sclerosis, Oshtoran syndrome, pediatric autoimmune neuropsychiatric disorder associated with *Streptococcus* (PANDAS), progressive inflammatory neuropathy, restless leg syndrome, stiff person syndrome, Sydenham chorea, transverse myelitis, autoimmune retinopathy, autoimmune uveitis, Cogan syndrome, Graves ophthalmopathy, intermediate uveitis, ligneous conjunctivitis, Mooren's ulcer, neuromyelitis optica, opsoclonus myoclonus syndrome, optic neuritis, scleritis, Susac's syndrome, sympathetic ophthalmia, Tolosa-Hunt syndrome, autoimmune inner ear disease, Ménière's disease, Behçet's disease, eosinophilic granulomatosis with polyangiitis, giant cell arteritis, granulomatosis with polyangiitis, IgA vasculitis, Kawasaki's disease, leukocytoclastic vasculitis, lupus vasculitis, rheumatoid vasculitis, microscopic polyangiitis, polyarteritis *nodosa*, polymyalgia rheumatic, urticarial vasculitis, vasculitis, and primary immune deficiency.

The term "infectious diseases," as used herein, refers to any disease associated with infection by an infectious agent. Examples of infectious agents include, without limitation, viruses and microorganisms (e.g., bacteria, parasites, protozoans, cryptosporidiums). Viruses include, without limitation, Hepadnaviridae including hepatitis A, B, C, D, E, F, G, etc.; Flaviviridae including human hepatitis C virus (HCV), yellow fever virus and dengue viruses; Retroviridae including human immunodeficiency viruses (HIV) and human T lymphotropic viruses (HTLV1 and HTLV2); Herpesviridae including herpes simplex viruses (HSV-1 and HSV-2), Epstein Barr virus (EBV), cytomegalovirus, varicella-zoster virus (VZV), human herpes virus 6 (HHV-6) human herpes virus 8 (HHV-8), and herpes B virus; Papovaviridae including human papilloma viruses; Rhabdoviridae including rabies virus; Paramyxoviridae including respiratory syncytial virus; Reoviridae including rotaviruses; Bunyaviridae including hantaviruses; Filoviridae including Ebola virus; Adenoviridae; Parvoviridae including parvovirus B-19; Arenaviridae including Lassa virus; Orthomyxoviridae including influenza viruses; Poxviridae including Orf virus, molluscum contageosum virus, smallpox virus and Monkey pox virus; Togaviridae including Venezuelan equine encephalitis virus; Coronaviridae including corona viruses such as the severe acute respiratory syndrome (SARS) virus; and Picornaviridae including polioviruses; rhinoviruses; orbiviruses; picodnaviruses; encephalomyocarditis virus (EMV); Parainfluenza viruses, adenoviruses, Coxsackieviruses, Echoviruses, Rubeola virus, Rubella virus, human papillomaviruses, Canine distemper virus, Canine contagious hepatitis virus, Feline calicivirus, Feline rhinotracheitis virus, TGE virus (swine), Foot and mouth disease virus, simian virus 5, human parainfluenza virus type 2, human metapneuomovirus, enteroviruses, and any other pathogenic virus now known or later identified (see, e.g., *Fundamental Virology*, Fields et al., Eds., 3$^{rd}$ ed., Lippincott-Raven, New York, 1996, the entire contents of which are incorporated by reference herein for the teachings of pathogenic viruses).

Pathogenic microorganisms include, but are not limited to, *Rickettsia, Chlamydia, Chlamydophila*, Mycobacteria, Clostridia, Corynebacteria, *Mycoplasma, Ureaplasma, Legionella, Shigella, Salmonella*, pathogenic *Escherichia coli* species, *Bordatella, Neisseria, Treponema, Bacillus, Haemophilus, Moraxella, Vibrio, Staphylococcus* spp., *Streptococcus* spp., *Campylobacter* spp., *Borrelia* spp., *Leptospira* spp., *Erlichia* spp., *Klebsiella* spp., *Pseudomonas* spp., *Helicobacter* spp., and any other pathogenic microorganism now known or later identified (see, e.g., Microbiology, Davis et al, Eds., 4$^{th}$ ed., Lippincott, New York, 1990, the entire contents of which are incorporated herein by reference for the teachings of pathogenic microorganisms). Specific examples of microorganisms include, but are not limited to, *Helicobacter pylori, Chlamydia pneumoniae, Chlamydia trachomatis, Ureaplasma urealyticum, Mycoplasma pneumoniae, Staphylococcus aureus, Streptococcus pyogenes, Streptococcus pneumoniae, Streptococcus viridans, Enterococcus faecalis, Neisseria meningitidis, Neisseria gonorrhoeae, Treponema pallidum, Bacillus anthracis, Salmonella typhi, Vibrio cholera, Pasteurella pestis (Yersinia pestis), Pseudomonas aeruginosa, Campylobacter jejuni, Clostridium difficile, Clostridium botulinum, Mycobacterium tuberculosis, Borrelia burgdorferi, Haemophilus ducreyi, Corynebacterium diphtheria, Bordetella pertussis, Bordetella parapertussis, Bordetella bronchiseptica, Haemophilus influenza, Listeria monocytogenes, Shigella flexneri, Anaplasma phagocytophilum*, enterotoxic *Escherichia coli*, and *Schistosoma haematobium*.

In some embodiments, the disease or disorder includes, but is not limited to, obesity, diabetes, heart disease, autism, fragile X syndrome, ATR-X syndrome, Angelman syndrome, Prader-Willi syndrome, Beckwith Wiedemann syndrome, Rett syndrome, Rubinstein-Taybi syndrome, Coffin-Lowry syndrome Immunodeficiency-centrometric instability-facial anomalies syndrome, α-thalassaemia, leukemia, Cornelia de Langue syndrome, Kabuki syndrome, progressive systemic sclerosis, and cardiac hypertrophy.

An additional aspect of the invention relates to a method for screening for an agent that modifies the epigenetic or mutation status of chromatin in a subject, comprising using the methods of the invention.

The screening method may be used to identify agents that increase or decrease chromatin accessibility or epigenetic modifications or mutations. In some embodiments, the detected increase or decrease is statistically significant, e.g., at least $p<0.05$, e.g., $p<0.01$, 0.005, or 0.001. In other embodiments, the detected increase or decrease is at least about 10%, 20%, 30%, 40%, 50%, 60%, 70%, 80%, 90%, 100% or more.

Any compound of interest can be screened according to the present invention. Suitable test compounds include organic and inorganic molecules. Suitable organic molecules can include but are not limited to small molecules (compounds less than about 1000 Daltons), polypeptides (including enzymes, antibodies, and antibody fragments), carbohydrates, lipids, coenzymes, and nucleic acid molecules (including DNA, RNA, and chimeras and analogs thereof) and nucleotides and nucleotide analogs.

Further, the methods of the invention can be practiced to screen a compound library, e.g., a small molecule library, a combinatorial chemical compound library, a polypeptide library, a cDNA library, a library of antisense nucleic acids, and the like, or an arrayed collection of compounds such as polypeptide and nucleic acid arrays.

Any suitable screening assay format may be used, e.g., high throughput screening.

The method may also be used to characterize agents that have been identified as an agent that modifies the epigenetic or mutation status of a specific genomic locus in chromatin. Characterization, e.g., preclinical characterization, may include, for example, determining effective concentrations, determining effective dosage schedules, and measuring pharmacokinetics and pharmacodynamics.

A further aspect of the invention relates to a method for assaying nucleosome accessibility or chromatin for a histone post-translational modification, mutation, and/or histone variant and/or a DNA post-transcriptional modification, wherein the improvement is the use of the nucleosome, panel, polynucleosome, array, pool, or bead of the invention in the assay as a spike-in control.

Another aspect of the invention relates to a method for assaying binding of a factor to chromatin, wherein the improvement is the use of the nucleosome, panel, polynucleosome, array, pool, or bead of the invention in the assay as a spike-in control. In some embodiments, the factor is a chromatin reader, writer, or eraser.

Having described the present invention, the same will be explained in greater detail in the following examples, which are included herein for illustration purposes only, and which are not intended to be limiting to the invention.

EXAMPLES

Figure 1:
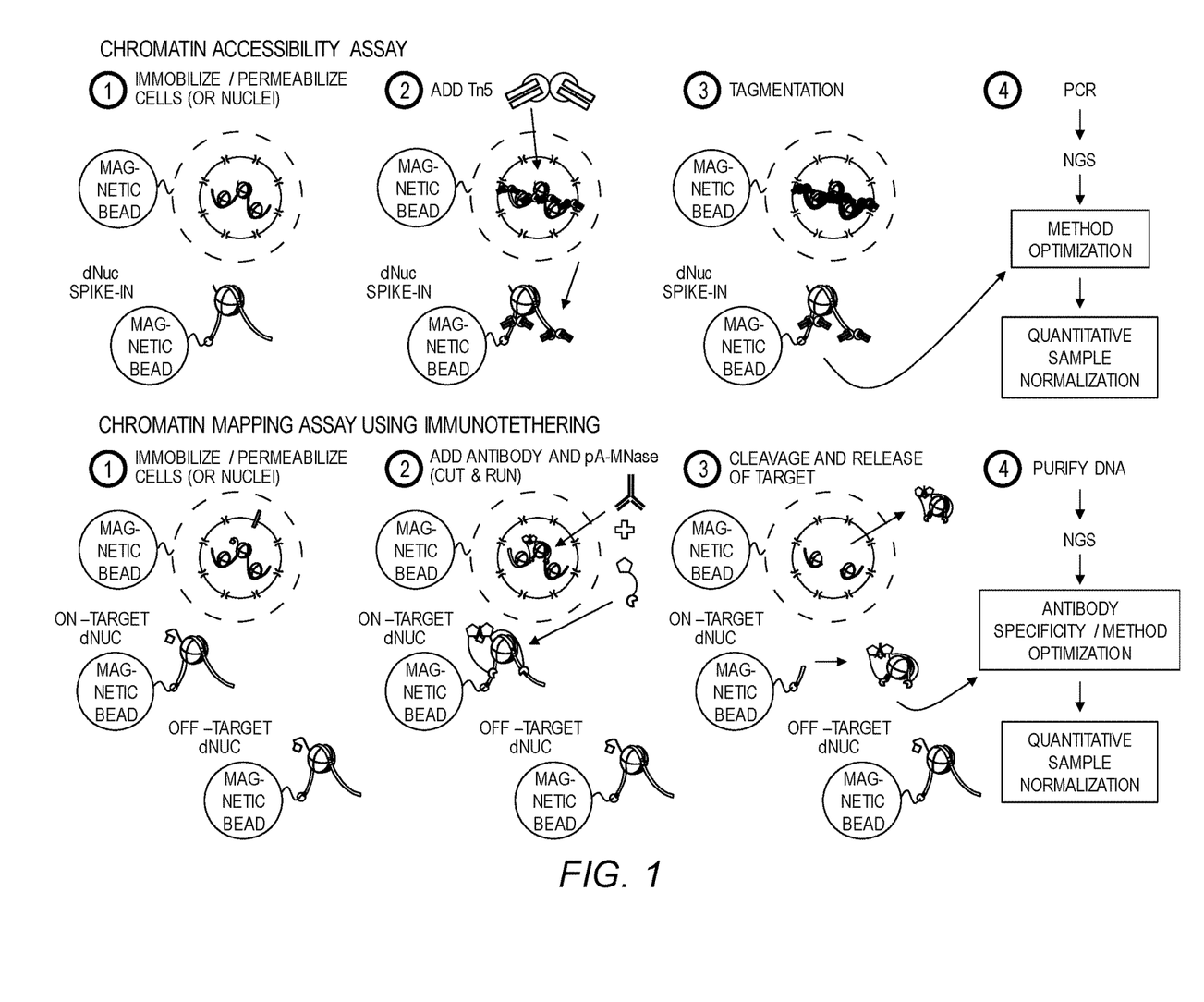
FIG. 1 shows a schematic of chromatin accessibility assays (top) and chromatin mapping assays (bottom) using DNA-barcoded nucleosome spike-in controls.

Example 1: Schematics of how DNA-Barcoded Nucleosomes can be Used in Chromatin Accessibility and Chromatin Mapping Assays The following examples show how DNA-barcoded nucleosomes can be used as spike-in controls in genomic mapping assays that use a solid support. Of note, nucleosome spike-ins can also be used in similar workflows that don't use a solid support. In the top example in FIG. 1, an ATAC-seq workflow is shown, where nucleosome spike-ins can be added to samples (cells or nuclei) before or after samples are bound to the solid support. Following immobilization, samples are permeabilized and incubated with Tn5 (loaded with adaptors compatible with Illumina sequencers), which binds to open chromatin. Tagmentation is initiated by the addition of magnesium, followed by DNA purification, PCR, and next-generation sequencing. Similar to sample chromatin, Tn5 will bind and tagment linker DNA on spike-in nucleosomes. DNA recovered from the spike-in nucleosome can be used for assay optimization, technical variability monitoring, and quantitative sample normalization for cross-sample comparisons. In the bottom example in FIG. 1, a CUT&RUN workflow is shown, where nucleosome spike-ins (containing on-target and/or off-target nucleosomes) can be added to samples (cells or nuclei) before or after samples are bound to the solid support. Following immobilization, samples are permeabilized and incubated with antibody and pAG-MNase. pAG-MNase is then activated via the addition of calcium, followed by DNA purification, library preparation, and next-generation sequencing. DNA recovered from the spike-in nucleosome can be used for antibody specificity testing, assay optimization, technical variability monitoring, and quantitative sample normalization for cross-sample comparisons. A similar workflow can be used for CUT&Tag assays with a few modifications, including replacing pAG-MNase with pAG-Tn5, activating with magnesium instead of calcium, and replacing library prep with a PCR step to prepare tagmented DNA fragments for next-generation sequencing.

Figure 2A:
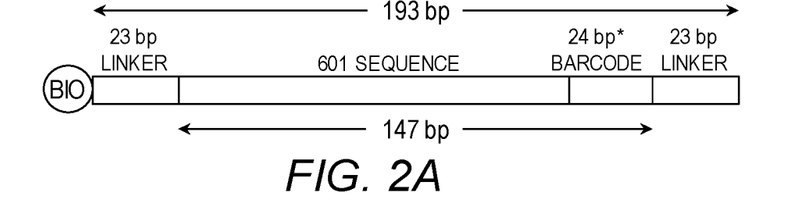
Figure 2B:
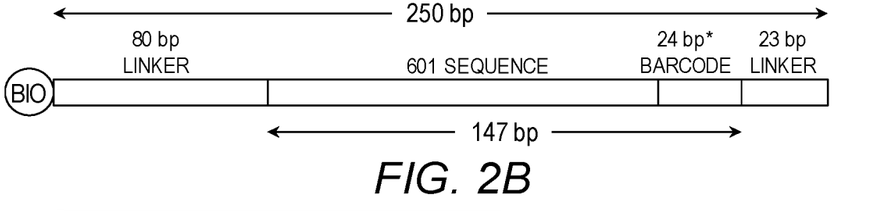
Figure 2C:
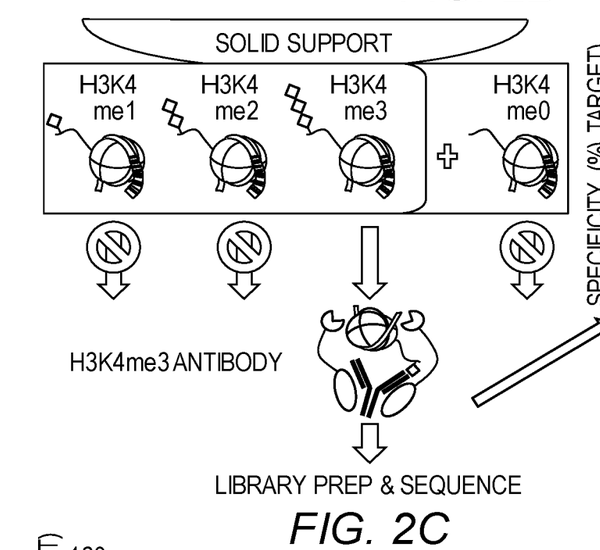
(FIG. 2C) Summary of spike-in panel, comprising unmodified, H3K4me1, H3K4me2, and H3K4me3 nucleosomes, and expected results using a highly specific antibody to H3K4me3.
Figure 2D:
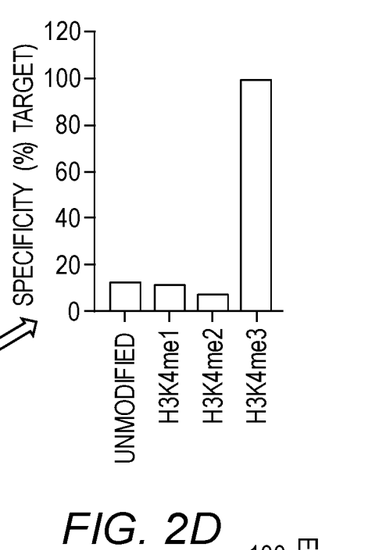
(FIG. 2D) Sequencing reads of nucleosome spike-in barcodes following CUT&RUN workflow using 500,000 K562 cells.
Figure 2E:
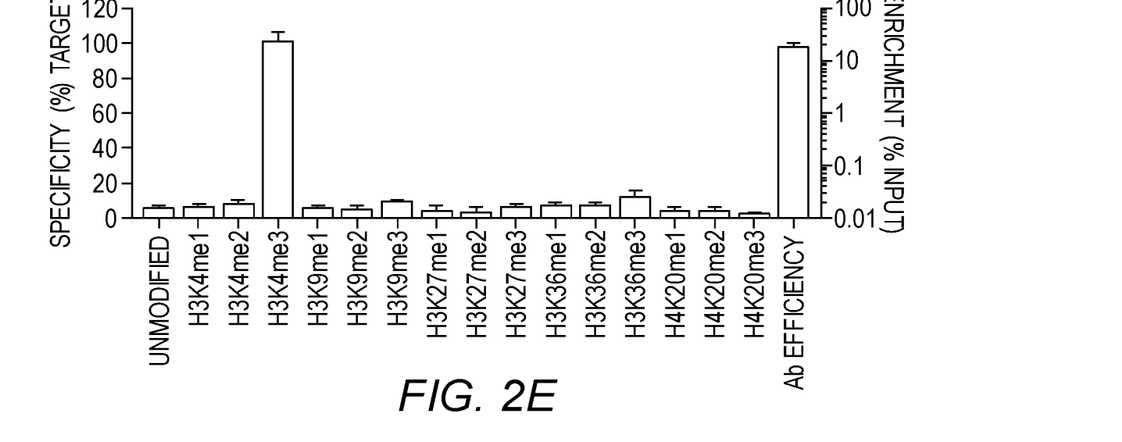
(FIG. 2E) SNAP-ChIP specificity data using the same H3K4me3 antibody analyzed in (FIG. 2D).

Example 2: Development of DNA-Barcoded Nucleosome Spike-in Controls for CUT&RUN Assays Various DNA configurations can be used as nucleosome positioning sequences to develop DNA-barcoded recombinant nucleosome spike-ins that are compatible with immunotethering approaches, such as CUT&RUN or CUT&Tag. Here, two different DNA templates for nucleosome assembly are shown. Each template is derived from the Widom 601 sequence (Lowary and Widom 1998), and is modified to contain a 24 bp barcode near the 147 bp 3' end. A 5' biotin and various linker lengths flanking the 147 bp nucleosome positioning sequence were also added (FIGS. 2A-2B). Next, these templates were used to generate a pilot panel of DNA-barcoded nucleosomes using recombinant modified octamers that are either unmodified or carry H3K4me1, H3K4me2, or H3K4me3 (each nucleosome denoted by a unique DNA barcode; FIG. 2C). Next, it was tested whether these nucleosomes could be used to monitor the specificity of an H3K4me3 antibody (EpiCypher; #13-0028) in a CUT&RUN workflow (FIG. 2C). For these experiments, CUT&RUN experiments were performed as previously described (Meers, Bryson et al. 2019), with the exception that: i) Con A beads were supplemented with streptavidin-coated beads to capture biotinylated dNuc spike-ins; and, ii) nucleosome spike-in panel was added prior to binding cells to Con A beads. If spike-ins are performing optimally, selective enrichment of the H3K4me3 dNuc barcode sequence in the sequencing data would be expected (vs. DNA barcodes for the unmodified, H3K4me1, or H3K4me2 dNucs). For this experiment, ~500,000 K562 cells were used and the sample was sequenced on an Illumina MiniSeq (4 million paired-end reads). As expected, specific enrichment of H3K4me3 was observed (FIG. 2D), similar to the specificity profile for this anti-H3K4me3 in SNAP-ChIP (FIG. 2E). Of note, these data were generated using the DNA template shown in FIG. 2B (i.e. longer linker DNA). We have found that longer linker DNA results in greater recovery of DNA-barcoded nucleosomes vs. those with shorter linker fragments.

The foregoing examples are illustrative of the present invention and are not to be construed as limiting thereof. Although the invention has been described in detail with reference to preferred embodiments, variations and modifications exist within the scope and spirit of the invention as described and defined in the following claims.

REFERENCES

Bai, L. and A. V. Morozov (2010). "Gene regulation by nucleosome positioning." *Trends Genet* 26(11): 476-483.

Bock, I., A. Dhayalan, S. Kudithipudi, O. Brandt, P. Rathert and A. Jeltsch (2011). "Detailed specificity analysis of antibodies binding to modified histone tails with peptide arrays." *Epigenetics* 6(2): 256-263.

Boyle, A. P., S. Davis, H. P. Shulha, P. Meltzer, E. H. Margulies, Z. Weng, T. S. Furey and G. E. Crawford (2008). "High-resolution mapping and characterization of open chromatin across the genome." *Cell* 132(2): 311-322.

Buenrostro, J. D., P. G. Giresi, L. C. Zaba, H. Y. Chang and W. J. Greenleaf (2013). "Transposition of native chromatin for fast and sensitive epigenomic profiling of open chromatin, DNA-binding proteins and nucleosome position." *Nat Methods* 10(12): 1213-1218.

Buenrostro, J. D., B. Wu, H. Y. Chang and W. J. Greenleaf (2015). "ATAC-seq: A Method for Assaying Chromatin Accessibility Genome-Wide." *Curr Protoc Mol Biol* 109: 21 29 21-29.

Cai, S. F., C. W. Chen and S. A. Armstrong (2015). "Drugging Chromatin in Cancer: Recent Advances and Novel Approaches." *Mol Cell* 60(4): 561-570.

Cao, J., D. A. Cusanovich, V. Ramani, D. Aghamirzaie, H. A. Pliner, A. J. Hill, R. M. Daza, J. L. McFaline-Figueroa, J. S. Packer, L. Christiansen, F. J. Steemers, A. C. Adey, C. Trapnell and J. Shendure (2018). "Joint profiling of chromatin accessibility and gene expression in thousands of single cells." *Science* 361(6409): 1380-1385.

Chen, K., Z. Hu, Z. Xia, D. Zhao, W. Li and J. K. Tyler (2015). "The Overlooked Fact: Fundamental Need for Spike-In Control for Virtually All Genome-Wide Analyses." *Mol Cell Biol* 36(5): 662-667.

Chervona, Y. and M. Costa (2012). "Histone modifications and cancer: biomarkers of prognosis?" *Am J Cancer Res* 2(5): 589-597.

Chopra, M. and S. K. Bohlander (2015). "Disturbing the histone code in leukemia: translocations and mutations affecting histone methyl transferases." *Cancer Genet* 208 (5): 192-205.

Collas, P. (2010). "The current state of chromatin immunoprecipitation." *Mol Biotechnol* 45(1): 87-100.

Coppede, F. (2014). "The potential of epigenetic therapies in neurodegenerative diseases." *Front Genet* 5: 220.

Corces, M. R., J. M. Granja, S. Shams, B. H. Louie, J. A. Seoane, W. Zhou, T. C. Silva, C. Groeneveld, C. K. Wong, S. W. Cho, A. T. Satpathy, M. R. Mumbach, K. A. Hoadley, A. G. Robertson, N. C. Sheffield, I. Felau, M. A. A. Castro, B. P. Berman, L. M. Staudt, J. C. Zenklusen, P. W. Laird, C. Curtis, N. Cancer Genome Atlas Analysis, W. J. Greenleaf and H. Y. Chang (2018). "The chromatin accessibility landscape of primary human cancers." *Science* 362(6413).

Crawford, G. E., I. E. Holt, J. Whittle, B. D. Webb, D. Tai, S. Davis, E. H. Margulies, Y. Chen, J. A. Bernat, D. Ginsburg, D. Zhou, S. Luo, T. J. Vasicek, M. J. Daly, T. G. Wolfsberg and F. S. Collins (2006). "Genome-wide mapping of DNase hypersensitive sites using massively parallel signature sequencing (MPSS)." *Genome Res* 16(1): 123-131.

Egan, B., C. C. Yuan, M. L. Craske, P. Labhart, G. D. Guler, D. Arnott, T. M. Maile, J. Busby, C. Henry, T. K. Kelly, C. A. Tindell, S. Jhunjhunwala, F. Zhao, C. Hatton, B. M. Bryant, M. Classon and P. Trojer (2016). "An Alternative Approach to ChIP-Seq Normalization Enables Detection of Genome-Wide Changes in Histone H3 Lysine 27 Trimethylation upon EZH2 Inhibition." *PLoS One* 11(11): e0166438.

Egelhofer, T. A., A. Minoda, S. Klugman, K. Lee, P. Kolasinska-Zwierz, A. A. Alekseyenko, M. S. Cheung, D. S. Day, S. Gadel, A. A. Gorchakov, T. Gu, P. V. Kharchenko, S. Kuan, I. Latorre, D. Linder-Basso, Y. Luu, Q. Ngo, M. Perry, A. Rechtsteiner, N. C. Riddle, Y. B. Schwartz, G. A. Shanower, A. Vielle, J. Ahringer, S. C. Elgin, M. I. Kuroda, V. Pirrotta, B. Ren, S. Strome, P. J. Park, G. H. Karpen, R. D. Hawkins and J. D. Lieb (2011). "An assessment of histone-modification antibody quality." *Nat Struct Mol Biol* 18(1): 91-93.

Fuchs, S. M., K. Krajewski, R. W. Baker, V. L. Miller and B. D. Strahl (2011). "Influence of combinatorial histone modifications on antibody and effector protein recognition." *Curr Biol* 21(1): 53-58.

Fuchs, S. M. and B. D. Strahl (2011). "Antibody recognition of histone post-translational modifications: emerging issues and future prospects." *Epigenomics* 3(3): 247-249.

Fullard, J. F., M. E. Hauberg, J. Bendl, G. Egervari, M. D. Cirnaru, S. M. Reach, J. Motd, M. E. Ehrlich, Y. L. Hurd and P. Roussos (2018). "An atlas of chromatin accessibility in the adult human brain." *Genome Res* 28(8): 1243-1252.

Gajer, J. M., S. D. Furdas, A. Grunder, M. Gothwal, U. Heinicke, K. Keller, F. Colland, S. Fulda, H. L. Pahl, I. Fichtner, W. Sippl and M. Jung (2015). "Histone acetyltransferase inhibitors block neuroblastoma cell growth in vivo." *Oncogenesis* 4: e137.

Giresi, P. G., J. Kim, R. M. McDaniell, V. R. Iyer and J. D. Lieb (2007). "FAIRE (Formaldehyde-Assisted Isolation of Regulatory Elements) isolates active regulatory elements from human chromatin." *Genome Res* 17(6): 877-885.

Gomez, N. C., A. J. Hepperla, R. Dumitru, J. M. Simon, F. Fang and I. J. Davis (2016). "Widespread Chromatin Accessibility at Repetitive Elements Links Stem Cells with Human Cancer." *Cell Rep* 17(6): 1607-1620.

Greenblatt, S. M. and S. D. Nimer (2014). "Chromatin modifiers and the promise of epigenetic therapy in acute leukemia." *Leukemia* 28(7): 1396-1406.

Hanmod, S. S., G. Wang, H. Edwards, S. A. Buck, Y. Ge, J. W. Taub and Z. Wang (2015). "Targeting histone deacetylases (HDACs) and Wee1 for treating high-risk neuroblastoma." *Pediatr Blood Cancer* 62(1): 52-59.

Hattori, T., J. M. Taft, K. M. Swist, H. Luo, H. Witt, M. Slattery, A. Koide, A. J. Ruthenburg, K. Krajewski, B. D. Strahl, K. P. White, P. J. Farnham, Y. Zhao and S. Koide (2013). "Recombinant antibodies to histone post-translational modifications." *Nat Methods* 10(10): 992-995.

Holdenrieder, S., P. Stieber, H. Bodenmuller, M. Busch, G. Fertig, H. Furst, A. Schalhorn, N. Schmeller, M. Untch and D. Seidel (2001). "Nucleosomes in serum of patients with benign and malignant diseases." *Int J Cancer* 95(2): 114-120.

Janes, J., Y. Dong, M. Schoof, J. Serizay, A. Appert, C. Cerrato, C. Woodbury, R. Chen, C. Gemma, N. Huang, D. Kissiov, P. Stempor, A. Steward, E. Zeiser, S. Sauer and J. Ahringer (2018). "Chromatin accessibility dynamics across *C. elegans* development and ageing." *Elife* 7.

Jin, W., Q. Tang, M. Wan, K. Cui, Y. Zhang, G. Ren, B. Ni, J. Sklar, T. M. Przytycka, R. Childs, D. Levens and K. Zhao (2015). "Genome-wide detection of DNase I hypersensitive sites in single cells and FFPE tissue samples." *Nature* 528(7580): 142-146.

Jung, S., V. E. Angarica, M. A. Andrade-Navarro, N. J. Buckley and A. Del Sol (2017). "Prediction of Chromatin Accessibility in Gene-Regulatory Regions from Transcriptomics Data." *Sci Rep* 7(1): 4660.

Kaya-Okur, H. S., S. J. Wu, C. A. Codomo, E. S. Pledger, T. D. Bryson, J. G. Henikoff, K. Ahmad and S. Henikoff (2019). "CUT&Tag for efficient epigenomic profiling of small samples and single cells." *Nat Commun* 10(1): 1930.

Khan, S. A., D. Reddy and S. Gupta (2015). "Global histone post-translational modifications and cancer: Biomarkers for diagnosis, prognosis and treatment?" *World J Biol Chem* 6(4): 333-345.

Klein, D. C. and S. J. Hainer (2019). "Genomic methods in profiling DNA accessibility and factor localization." *Chromosome Res.*

Kobayashi, K., L. M. Jakt and S. I. Nishikawa (2013). "Epigenetic regulation of the neuroblastoma genes, Arid3b and Mycn." *Oncogene* 32(21): 2640-2648.

Leon, S. A., B. Shapiro, D. M. Sklaroff and M. J. Yaros (1977). "Free DNA in the serum of cancer patients and the effect of therapy." *Cancer Res* 37(3): 646-650.

Lowary, P. T. and J. Widom (1998). "New DNA sequence rules for high affinity binding to histone octamer and sequence-directed nucleosome positioning." *J Mol Biol* 276(1): 19-42.

Medrano-Fernandez, A. and A. Barco (2016). "Nuclear organization and 3D chromatin architecture in cognition and neuropsychiatric disorders." *Mol Brain* 9(1): 83.

Meers, M. P., T. D. Bryson, J. G. Henikoff and S. Henikoff (2019). "Improved CUT&RUN chromatin profiling tools." *Elife* 8.

Miyamoto, K., K. T. Nguyen, G. E. Allen, J. Jullien, D. Kumar, T. Otani, C. R. Bradshaw, F. J. Livesey, M. Kellis and J. B. Gurdon (2018). "Chromatin Accessibility Impacts Transcriptional Reprogramming in Oocytes." *Cell Rep* 24(2): 304-311.

Nakato, R. and K. Shirahige (2017). "Recent advances in ChIP-seq analysis: from quality management to whole-genome annotation." *Brief Bioinform* 18(2): 279-290.

Natarajan, A., G. G. Yardimci, N. C. Sheffield, G. E. Crawford and U. Ohler (2012). "Predicting cell-type-specific gene expression from regions of open chromatin." *Genome Res* 22(9): 1711-1722.

Nishikori, S., T. Hattori, S. M. Fuchs, N. Yasui, J. Wojcik, A. Koide, B. D. Strahl and S. Koide (2012). "Broad ranges of affinity and specificity of anti-histone antibodies revealed by a quantitative peptide immunoprecipitation assay." *J Mol Biol* 424(5): 391-399.

Orlando, D. A., M. W. Chen, V. E. Brown, S. Solanki, Y. J. Choi, E. R. Olson, C. C. Fritz, J. E. Bradner and M. G. Guenther (2014). "Quantitative ChIP-Seq normalization reveals global modulation of the epigenome." *Cell Rep* 9(3): 1163-1170.

Qu, K., L. C. Zaba, A. T. Satpathy, P. G. Giresi, R. Li, Y. Jin, R. Armstrong, C. Jin, N. Schmitt, Z. Rahbar, H. Ueno, W. J. Greenleaf, Y. H. Kim and H. Y. Chang (2017). "Chromatin Accessibility Landscape of Cutaneous T Cell Lymphoma and Dynamic Response to HDAC Inhibitors." *Cancer Cell* 32(1): 27-41 e24.

Rizzardi, L. F., P. F. Hickey, V. Rodriguez DiBlasi, R. Tryggvadottir, C. M. Callahan, A. Idrizi, K. D. Hansen and A. P. Feinberg (2019). "Neuronal brain-region-specific DNA methylation and chromatin accessibility are associated with neuropsychiatric trait heritability." *Nat Neurosci* 22(2): 307-316.

Rothbart, S. B., B. M. Dickson, J. R. Raab, A. T. Grzybowski, K. Krajewski, A. H. Guo, E. K. Shanle, S. Z. Josefowicz, S. M. Fuchs, C. D. Allis, T. R. Magnuson, A. J. Ruthenburg and B. D. Strahl (2015). "An Interactive Database for the Assessment of Histone Antibody Specificity." *Mol Cell* 59(3): 502-511.

Rothbart, S. B., S. Lin, L. M. Britton, K. Krajewski, M. C. Keogh, B. A. Garcia and B. D. Strahl (2012). "Polyacetylated chromatin signatures are preferred epitopes for site-specific histone H4 acetyl antibodies." *Sci Rep* 2: 489.

Schlesinger, F., A. D. Smith, T. R. Gingeras, G. J. Hannon and E. Hodges (2013). "De novo DNA demethylation and noncoding transcription define active intergenic regulatory elements." *Genome Res* 23(10): 1601-1614.

Shah, R. N., A. T. Grzybowski, E. M. Cornett, A. L. Johnstone, B. M. Dickson, B. A. Boone, M. A. Cheek, M. W. Cowles, D. Maryanski, M. J. Meiners, R. L. Tiedemann, R. M. Vaughan, N. Arora, Z. W. Sun, S. B. Rothbart, M. C. Keogh and A. J. Ruthenburg (2018). "Examining the Roles of H3K4 Methylation States with Systematically Characterized Antibodies." *Mol Cell*.

Skene, P. J., J. G. Henikoff and S. Henikoff (2018). "Targeted in situ genome-wide profiling with high efficiency for low cell numbers." *Nat Protoc* 13(5): 1006-1019.

Snyder, M. W., M. Kircher, A. J. Hill, R. M. Daza and J. Shendure (2016). "Cell-free DNA Comprises an In Vivo Nucleosome Footprint that Informs Its Tissues-Of-Origin." *Cell* 164(1-2): 57-68.

Solomon, M. J. and A. Varshavsky (1985). "Formaldehyde-mediated DNA-protein crosslinking: a probe for in vivo chromatin structures." *Proc Natl Acad Sci USA* 82(19): 6470-6474.

Stavreva, D. A. and G. L. Hager (2015). "Chromatin structure and gene regulation: a dynamic view of enhancer function." *Nucleus* 6(6): 442-448.

Tsompana, M. and M. J. Buck (2014). "Chromatin accessibility: a window into the genome." *Epigenetics Chromatin* 7(1): 33.

Ucar, D., E. J. Marquez, C. H. Chung, R. Marches, R. J. Rossi, A. Uyar, T. C. Wu, J. George, M. L. Stitzel, A. K. Palucka, G. A. Kuchel and J. Banchereau (2017). "The chromatin accessibility signature of human immune aging stems from CD8(+) T cells." *J Exp Med* 214(10): 3123-3144.

Ulz, P., G. G. Thallinger, M. Auer, R. Graf, K. Kashofer, S. W. Jahn, L. Abete, G. Pristauz, E. Petru, J. B. Geigl, E. Heitzer and M. R. Speicher (2016). "Inferring expressed genes by whole-genome sequencing of plasma DNA." *Nat Genet* 48(10): 1273-1278.

Wang, J., C. Zibetti, P. Shang, S. R. Sripathi, P. Zhang, M. Cano, T. Hoang, S. Xia, H. Ji, S. L. Merbs, D. J. Zack, J. T. Handa, D. Sinha, S. Blackshaw and J. Qian (2018). "ATAC-Seq analysis reveals a widespread decrease of chromatin accessibility in age-related macular degeneration." *Nat Commun* 9(1): 1364.

Witt, O., H. E. Deubzer, M. Lodrini, T. Milde and I. Oehme (2009). "Targeting histone deacetylases in neuroblastoma." *Curr Pharm Des* 15(4): 436-447.

We claim:

1. A nucleosome comprising: a. a protein octamer, containing two copies each of histones H2A, H2B, H3, and H4, and optionally, linker histone H1; b. a DNA molecule, comprising: i. a nucleosome positioning sequence, ii a synthetic DNA barcode indicative of the identity and/or concentration of a nucleosome feature; and iii. one or more linkers, wherein the one or more linkers comprises a nuclease and/or transposase recognition sequence; and c. a binding member linked to the DNA molecule, wherein the binding member is one half of a binding pair; wherein the nucleosome feature is none, one, or more of the histones comprising a post-translational modification or a mutation and/or a histone variant and/or the DNA molecule comprising a post-transcriptional modification wherein at least one of the one or more linkers is between the nucleosome positioning sequence and the binding member; and wherein the nucleosome is a spike-in control for a chromatin assay.

2. The nucleosome of claim 1, wherein said linker is 10 to 80 nucleotides in length.

3. The nucleosome of claim 1, wherein the nuclease or transposase recognition sequence is recognized by an endodeoxyribonuclease.

4. The nucleosome of claim 3, wherein the endodeoxyribonuclease is micrococcal nuclease, Si nuclease, mung bean nuclease, pancreatic DNase I, yeast HO or I-Scel endonuclease, a restriction endonuclease, or a homing endonuclease.

5. The nucleosome of claim 1, wherein the nuclease or transposase recognition sequence is recognized by a transposase.

6. The nucleosome of claim 5, wherein the transposase is Tn5, Mu, IS5, IS91, Tn552, Tyl, Tn7, Tn/O, Mariner, P Element, Tn3, Tn10, or Tn903.

7. The nucleosome of claim 1, wherein the binding member and its binding partner are biotin with avidin or streptavidin, a nano-tag with streptavidin, glutathione with glutathione transferase, an antigen/epitope with an antibody, polyhistidine with nickel, a polynucleotide with a complementary polynucleotide, an aptamer with its specific target molecule, or Si-tag and silica.

8. The nucleosome of claim 1, wherein the binding member is linked to the 5' end of the DNA molecule.

9. The nucleosome of claim 1, wherein the binding member is linked to the 3' end of the DNA molecule.

10. The nucleosome of claim 1, wherein the synthetic DNA barcode has a length of 6 to 50 base-pairs.

11. The nucleosome of claim 1, wherein each histone in the nucleosome is independently fully synthetic, semi-synthetic, or recombinant.

12. The nucleosome of claim 1, wherein the histone post-translational modifications are N-acetylation of serine and alanine; phosphorylation of serine, threonine and tyrosine; N-crotonylation, N-acylation of lysine; N6-methylation, N6, N6-dimethylation, N6, N6, N6-trimethylation of lysine; omega-N-methylation, symmetrical-dimethylation, asymmetrical-dimethylation of arginine; citrullination of arginine; ubiquitinylation of lysine; sumoylation of lysine; O-methylation of serine and threonine, ADP-ribosylation of arginine, aspartic acid and glutamic acid, or any combination thereof.

13. The nucleosome of claim 1, wherein the histone variants are H3.3, H2A.Bbd, H2A.Z.1, H2A.Z.2, H2A.X, mH2A1.1, mH2A1.2, mH2A2, TH2B, or any combination thereof.

14. The nucleosome of claim 1, wherein the DNA post-transcriptional modifications are 5-methylcytosine, 5-hydroxymethylcytosine, 5-formylcytosine, 5-carboxylcytosine, 3-methylcytosine, or any combination thereof.

15. A panel of the nucleosomes of claim 1, wherein the panel comprises at least two nucleosomes comprising different nucleosome features.

16. The panel of claim 15, wherein each nucleosome comprising a different nucleosome feature is present at the same concentration in the panel.

17. The panel of claim 15, wherein each nucleosome comprising a different nucleosome feature is present at multiple concentrations in the panel and the synthetic DNA barcode of each nucleosome indicates the concentration at which the nucleosome is present in the panel.

18. The panel of claim 15, further comprising a nucleosome which does not comprise a nucleosome feature.

19. A bead comprising a binding partner to the binding member of the nucleosome of claim 1, wherein the bead is bound to the nucleosome.

20. A kit comprising the nucleosome of claim 1.

21. The nucleosome of claim 1, wherein the one or more linkers are at the 5' and/or 3' end of the DNA molecule.

* * * * *